United States Patent
Sato et al.

(10) Patent No.: US 10,921,527 B2
(45) Date of Patent: Feb. 16, 2021

(54) OPTICAL FIBER HOLDER

(71) Applicant: SEI OPTIFRONTIER CO., LTD., Yokohama (JP)

(72) Inventors: Ryuichiro Sato, Chigasaki (JP); Hiroshi Takayanagi, Chigasaki (JP); Hiroshi Nakamura, Chigasaki (JP)

(73) Assignee: SEI OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 16/330,800

(22) PCT Filed: Jul. 28, 2017

(86) PCT No.: PCT/JP2017/027458
§ 371 (c)(1),
(2) Date: Mar. 6, 2019

(87) PCT Pub. No.: WO2018/047513
PCT Pub. Date: Mar. 15, 2018

(65) Prior Publication Data
US 2019/0235173 A1   Aug. 1, 2019

(30) Foreign Application Priority Data
Sep. 9, 2016   (JP) .............................. JP2016-176353

(51) Int. Cl.
*G02B 6/36*      (2006.01)
*G02B 6/24*      (2006.01)

(52) U.S. Cl.
CPC ............. *G02B 6/3616* (2013.01); *G02B 6/24* (2013.01)

(58) Field of Classification Search
CPC ................................. G02B 6/3616; G02B 6/24
See application file for complete search history.

(56) References Cited

U.S. PATENT DOCUMENTS

| | | | |
|---|---|---|---|
| 6,222,967 B1 | 4/2001 | Amano et al. | |
| 8,861,920 B2 * | 10/2014 | Sato | G02B 6/2553 |
| | | | 385/137 |
| 9,726,828 B2 * | 8/2017 | Yuan | G02B 6/25 |
| 2012/0251068 A1 | 10/2012 | Sato et al. | |
| 2015/0323746 A1 | 11/2015 | Yuan | |

FOREIGN PATENT DOCUMENTS

| | | |
|---|---|---|
| CN | 102667588 A | 9/2012 |
| CN | 202502267 U | 10/2012 |
| JP | A-H07-218753 | 8/1995 |
| JP | A-H07-218754 | 8/1995 |
| JP | 2005-258129 A | 9/2005 |
| JP | A-2007-298705 | 11/2007 |
| JP | A-2012-128125 | 7/2012 |

* cited by examiner

*Primary Examiner* — John Bedtelyon
(74) *Attorney, Agent, or Firm* — Faegre Drinker Biddle & Reath LLP

(57) ABSTRACT

Provided is an optical fiber holder comprising a holder body and a cover. The holder body has an accommodation section capable of accommodating a plurality of optical fibers. The holder body or the cover has at least one ridge which can be disposed within the accommodation section. When the cover is closed over the holder body, a plurality of sections which can parallelly accommodate the plurality of optical fibers are parallelly formed by the inner surface of the accommodation section, the lower surface of the cover, and the ridge.

9 Claims, 18 Drawing Sheets

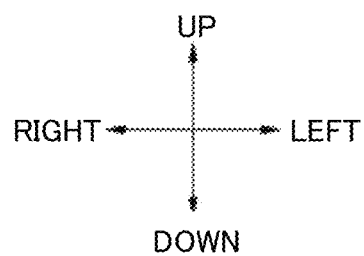
*FIG.9*
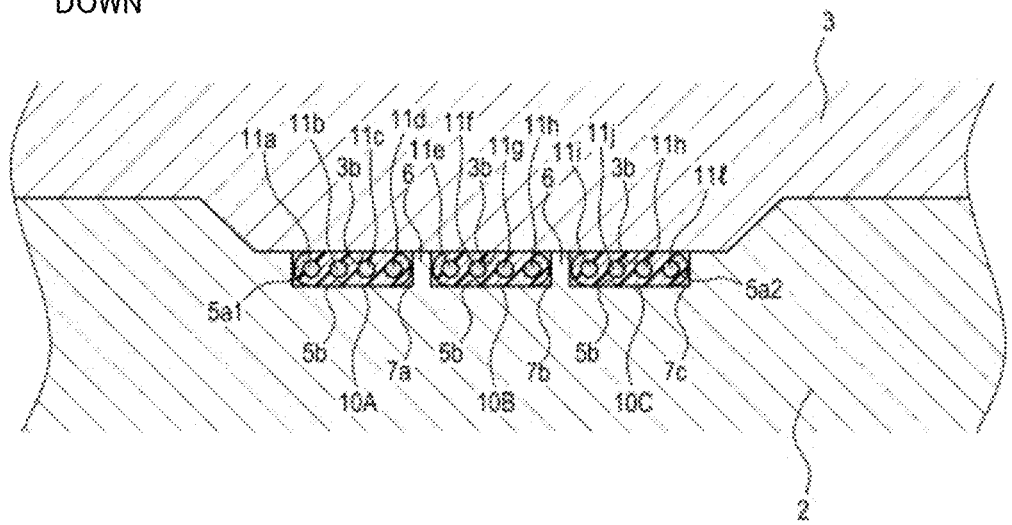
*FIG.10*
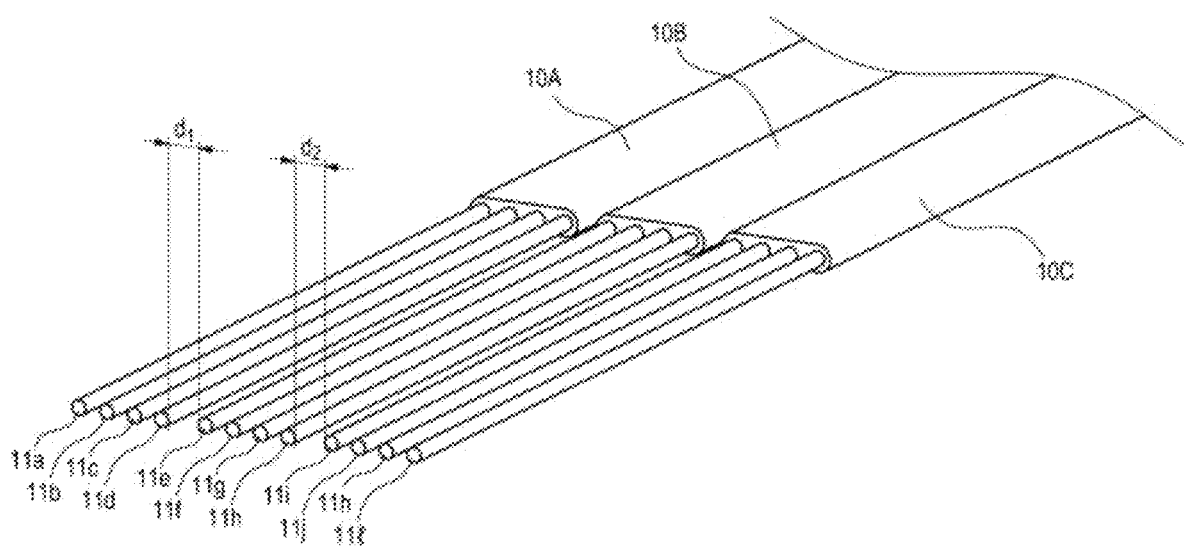

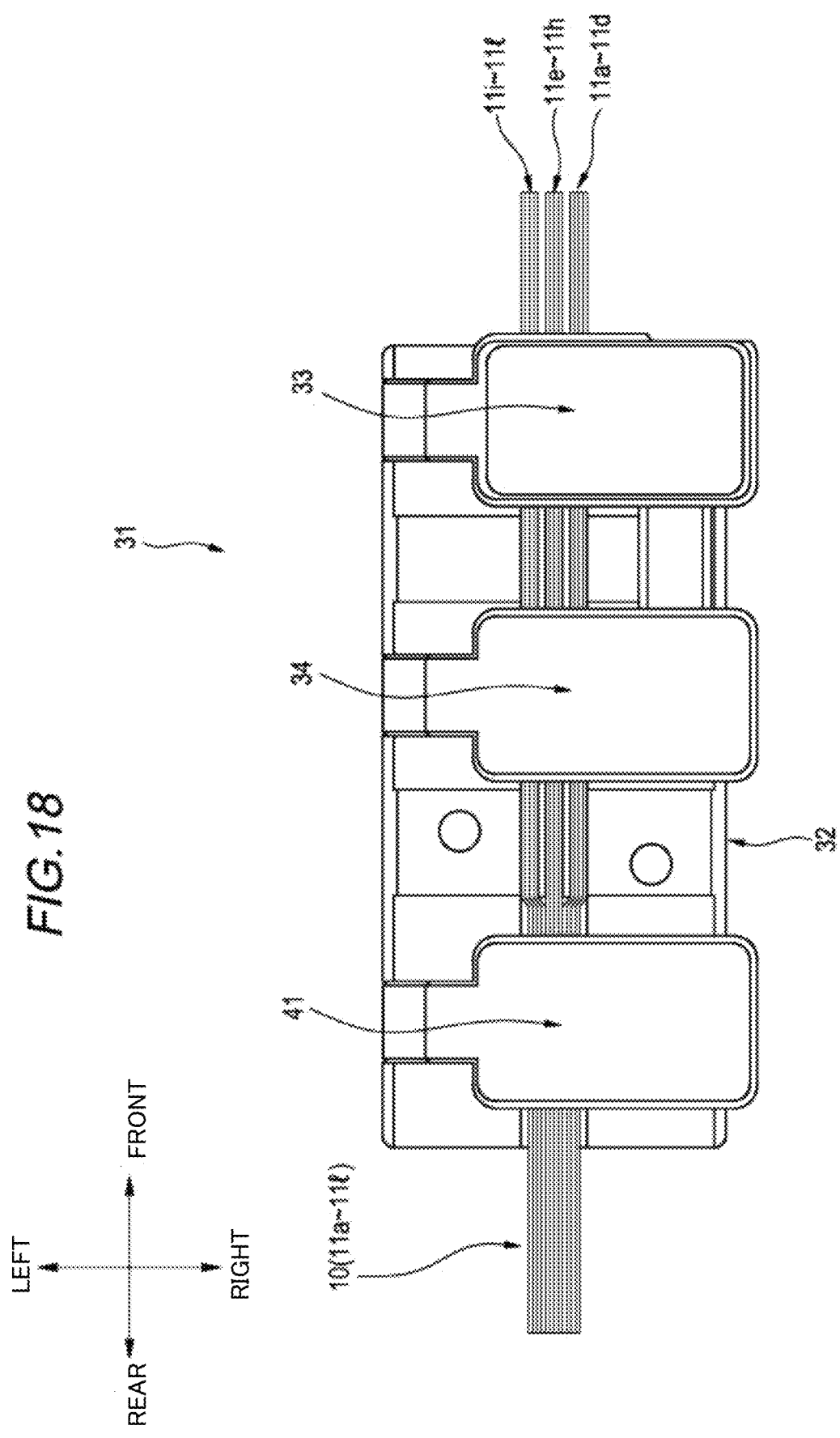

OPTICAL FIBER HOLDER

TECHNICAL FIELD

The present invention relates to an optical fiber holder.

This application claims priority based on Japanese Patent Application No. 2016-176353 filed on Sep. 9, 2016, and all contents described in the Japanese Patent Application are incorporated by reference.

BACKGROUND ART

Patent literature 1 discloses an optical fiber holder including a first arrangement groove for aligning a plurality of optical fiber core wires in a holder body, a plurality of positioning grooves for converting an arrangement pitch of the optical fiber core wires in a longitudinal direction of the first alignment groove, and a second arrangement groove having a width narrower than that of the first arrangement groove for aligning the optical fiber core wires removing a second coating layer in a longitudinal direction of the positioning grooves.

CITATION LIST

Patent Literature

Patent literature 1: JP-A-2005-258129

SUMMARY OF INVENTION

An optical fiber holder according to an aspect of the present disclosure includes:

a holder body;

a first lid; and a second lid, wherein the holder body includes a housing portion that is configured to house a plurality of optical fibers, the holder body includes at least one linear protrusion along a longitudinal direction of the holder body in the housing portion, the housing portion includes a plurality of grooves that include a constant groove width and that is configured to house the plurality of optical fibers in parallel respectively between the protrusion and an inner surface of the housing portion, the plurality of optical fibers are configured to be held in parallel respectively in the plurality of grooves in a state where the first lid is closed with respect to the holder body, and the plurality of optical fibers are configured to be housed in a movable state where the plurality of optical fibers are movable in parallel respectively in the plurality of grooves, in a state where the second lid is closed with respect to the holder body.

An optical fiber holder according to another aspect of the present disclosure includes:

a holder body; and a lid, wherein the holder body includes a housing portion that is configured to house a plurality of optical fibers, the holder body or the lid includes at least one protrusion that is capable of being disposed in the housing portion, and a plurality of sections are formed in parallel such that the plurality of sections are configured to house the plurality of optical fibers in parallel respectively by an inner surface of the housing portion, a lower surface of the lid, and the protrusion in a state where the lid is closed with respect to the holder body.

BRIEF DESCRIPTION OF DRAWINGS

FIG. 9 is a partial enlarged sectional view taken along line B-B in FIG. 8.

FIG. 10 is a perspective view showing an example of the optical fiber ribbon after insertion into the optical fiber holder according to the first embodiment.

FIG. 18 is a top view showing a state in which a plurality of optical fibers are inserted into the optical fiber holder according to the second embodiment and all lids are closed with respect to the body.

DESCRIPTION OF EMBODIMENTS

Technical Problem

Figure 1:
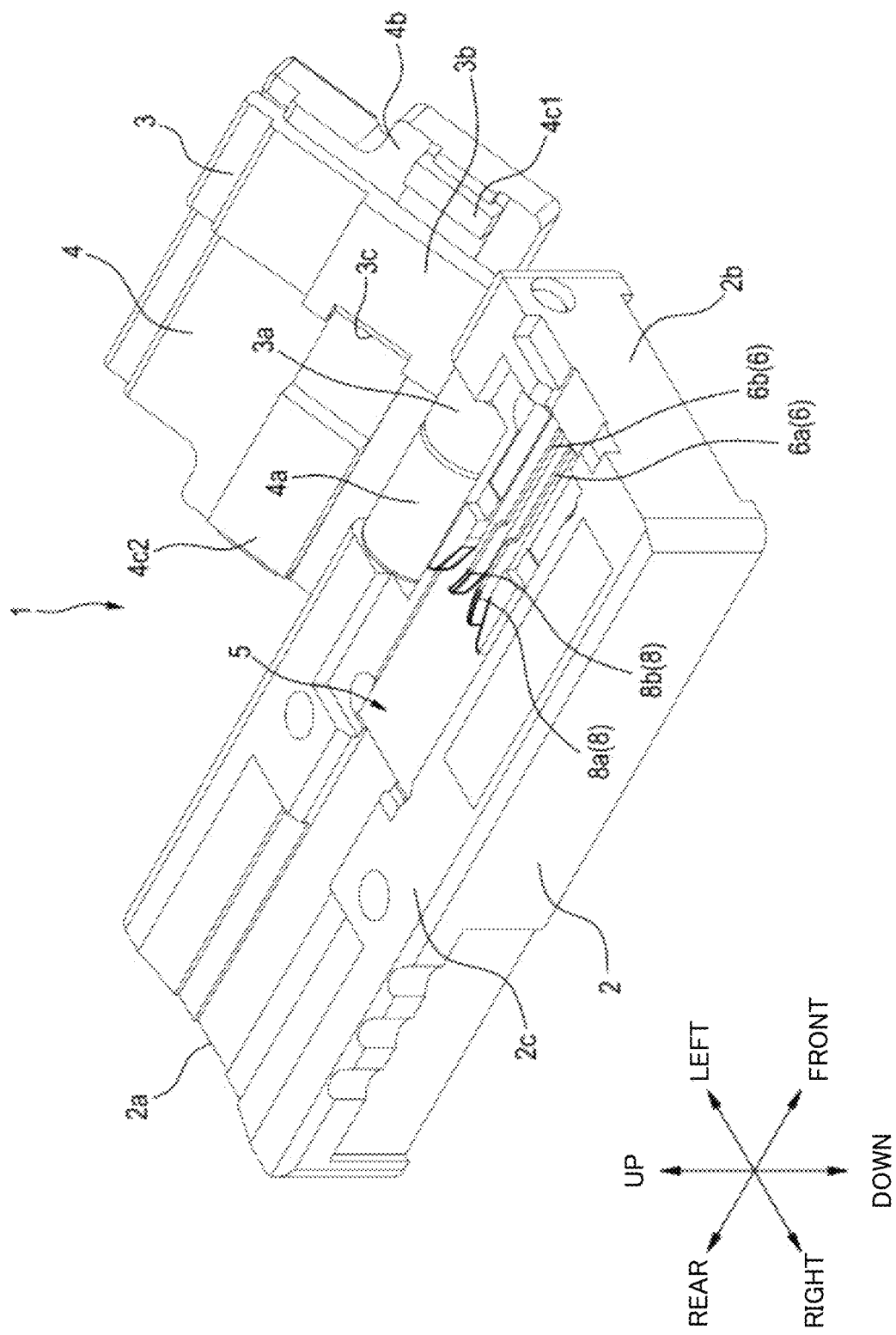
FIG. 1 is a perspective view of an optical fiber holder according to a first embodiment.

In recent years, as a diameter of an optical fiber is reduced, an optical fiber which is normally used with an outer diameter of 0.25 mm has been reduced in diameter, for example, an optical fiber having an outer diameter of 0.20 mm can be manufactured now. However, since a pitch of V grooves of a fusion machine or the like that fuses optical fiber ribbons with each other (or a plurality of optical fibers in parallel with each other) is 0.25 mm, a position of the optical fibers and a position of the V grooves are shifted when the optical fiber ribbons with an arrangement pitch of 0.20 mm are fused with each other, and it is difficult to arrange the optical fibers in the V grooves reliably. In order to set the pitch of the V grooves to 0.20 mm, it is necessary to newly design and manufacture a fusion machine or the like and set the pitch of the V grooves to 0.20 mm by remodeling or exchanging the existing V groove portions of the fusion machine or the like, which takes time and cost.

For example, even if an optical fiber holder in Patent literature 1 is used, it is difficult to arrange a plurality of optical fibers in parallel so as to correspond to the fusion machine or the like that corresponds to an arrangement pitch different from the arrangement pitch of the optical fibers before the optical fibers are held in the optical fiber holder.

An object of the present disclosure is to provide an optical fiber holder in which a plurality of optical fibers can be arranged in parallel such that all of the optical fibers can be reliably placed in V grooves even using a fusion machine or the like including the V grooves with an arrangement pitch different from the arrangement pitch of the plurality of optical fibers before the optical fibers are held in the optical fiber holder.

Effect of the Disclosure

According to the present disclosure, a plurality of optical fibers can be arranged in parallel such that all of the optical fibers can be reliably placed in the V grooves even by using the fusion machine or the like that includes V grooves with an arrangement pitch different from the arrangement pitch of the plurality of optical fibers before the optical fibers are held in the optical fiber holder.

Description of Embodiments of the Invention

First, embodiments of the present invention is listed and described.

An optical fiber holder according to embodiments of the present invention includes:
(1) a holder body;
  a first lid; and a second lid, wherein
  the holder body includes a housing portion that is configured to house a plurality of optical fibers,
  the holder body includes at least one linear protrusion along a longitudinal direction of the holder body in the housing portion, the housing portion includes a plurality of grooves that include a constant groove width and that is configured to house the plurality of optical fibers in parallel respectively between the protrusion and an inner surface of the housing portion,
  the plurality of optical fibers are configured to be held in parallel respectively in the plurality of grooves in a state where the first lid is closed with respect to the holder body, and
  the plurality of optical fibers are configured to be housed in a movable state where the plurality of optical fibers are movable in parallel respectively in the plurality of grooves, in a state where the second lid is closed with respect to the holder body.

According to the above configuration, the grooves of the housing portion are spaced from adjacent grooves by a degree of the width of the protrusion, and a plurality of housed optical fibers are arranged in parallel at the space for each of the plurality of optical fibers.

Accordingly, even if a width of the entire optical fiber array is extended and the fusion machine or the like is used such that the fusion machine or the like includes V grooves with an arrangement pitch different from the arrangement pitch of the plurality of optical fibers before the plurality of optical fibers are held in the optical fiber holder, the plurality of optical fibers can be arranged in parallel such that all the optical fibers can be reliably placed in the V grooves.
(2) A height of the protrusion is 0.15 mm or above and 0.3 mm or below.

A guide function can be obtained and the operation can be easy when optical fibers having an outer diameter of 0.20 mm are put into the grooves while handled with a ball of a finger, and overlapping of the optical fibers in the grooves can be suppressed. Further, it is possible to reliably hold the optical fibers having an outer diameter of 0.20 mm.
(3) A third lid is further included, and
  the housing portion includes wide grooves and does not provide with the protrusion at a covered position in a state where the third lid is closed respect to the holder body.

By closing the third lid 41, the optical fibers can be held more reliably.

An optical fiber holder according to another embodiment of the present invention includes:
(4) a holder body; and
  a lid, wherein
  the holder body includes a housing portion that is configured to house a plurality of optical fibers,
  the holder body or the lid includes at least one protrusion that is capable of being disposed in the housing portion, and
  a plurality of sections are formed in parallel such that the plurality of sections are configured to house the plurality of optical fibers in parallel respectively by an inner surface of the housing portion, a lower surface of the lid, and the protrusion in a state where the lid is closed with respect to the holder body.

According to the above configuration, the sections of the housing portion are spaced from adjacent sections by a degree of the width of the protrusion, and the plurality of optical fibers inserted into the sections are arranged in parallel at the space for each of the plurality of optical fibers.

Accordingly, a width of the entire optical fiber array is extended before and after the insertion, and an averaged arrangement pitch of the optical fibers after the insertion is wider than an arrangement pitch before the insertion. Therefore, the plurality of optical fibers can be arranged in parallel such that all of the optical fibers can be certainly placed in the V grooves even by using the fusion machine or the like that includes V grooves with the arrangement pitch different from the arrangement pitch of the plurality of optical fibers before the plurality of optical fibers are held in the optical fiber holder.

(5) The protrusion has a width of 0.17 mm or above and 0.27 mm or below.

When the optical fiber core wires with a pitch of 0.20 mm is placed in the V grooves of the fusion machine or the like with a pitch of 0.25 mm, by setting the width of the protrusion to 0.17 mm or above and 0.27 mm or below, only one optical fiber core wire abuts on an inclined surface of each V groove and fits into the V groove along the inclined surface, so one optical fiber core wire can be placed in each V groove.

(6) A distance between centers of adjacent sections is 0.95 mm or above and 1.05 mm or below.

When optical fiber core wires with a pitch of 0.20 mm are placed in the V grooves of the fusion machine or the like with a pitch of 0.25 mm, by setting the distance between the centers of the adjacent sections to 0.95 mm or above and 1.05 mm or below, only one optical fiber core wire abuts on an inclined surface of each V groove and fits into the V groove along the inclined surface, so one optical fiber core wire can be placed in each V groove.

(7) The holder body includes a section outer protrusion that is provided to be continuous from the protrusion on one side of the housing portion outside the section, widening side surfaces are provided on two both side surfaces in an inner side of the housing portion on one side outside the section such that the widening side surfaces are respectively continuous from side surfaces of sections, among the plurality of sections, on both side surfaces in the inner side of the housing portion, and the widening side surfaces have a shape in which a space between the widening side surfaces is extended along a longitudinal direction of the housing portion as being away from the section.

Since the widening side surface extends as being away from the section along the longitudinal direction of the housing portion, a width between the widening side surface as an entrance for inserting the plurality of optical fibers and the section outer protrusion is wider than a width of a section on the side surface side of the housing portion. Therefore, even when the width of the section is not much larger than the width of the plurality of optical fibers to be inserted, since the entrance is wider than the width of the section, it is easy to insert the plurality of optical fibers from the entrance.

(8) A plurality of the protrusions are included, the holder body includes, on one side outside the section of the housing portion, a plurality of section outer protrusions provided so as to be continuous from the plurality of the protrusions respectively, and the plurality of section outer protrusions have a shape in which a space between adjacent section outer protrusions is extended along a longitudinal direction of the housing portion as being away from the section.

Since the space between the adjacent section protrusions is extended as being away from the section along the longitudinal direction of the housing portion, a width between ends of the adjacent section outer protrusions is wider than the width of the section. Therefore, the width between the ends of the section outer protrusions as the entrance for inserting the plurality of optical fibers is wider than the width of the section between the adjacent protrusions. Therefore, even when the width of the section is not much larger than the width of the plurality of optical fibers to be inserted, since the entrance is wider than the width of the section, it is easy to insert the plurality of optical fibers from the entrance.

(9) The lid is provided with a tapered surface where the lower surface is recessed on one side end of the section in a longitudinal direction.

The upper surface (ceiling) of the entrance of the section is higher toward the outside of the section by the tapered surface provided on the lid. Therefore, the entrance portion of the section is extended upward from the interior of the section, and the plurality of optical fibers are easily inserted from the entrance.

(10) A second lid is further included, and a plurality of optical fibers housed in the housing portion and inserted into the section are configured to be held in the housing portion in a state where the second lid is closed with respect to the holder body.

Since the second lid is closed with respect to the holder body, it is possible to hold the plurality of optical fibers housed in the housing portion and inserted into the section.

Details of Embodiments of the Invention

A specific example of an optical fiber holder according to embodiments of the present invention is described below with reference to the drawings.

The present invention is not limited to these examples but is indicated by the scope of claims, and is intended to include meanings equivalent to the scope of claims and all modifications within the scope.

In the following description, a front-rear direction, a left-right direction, and an up-down direction are directions of arrows shown as appropriate in the drawings.

First Embodiment

An optical fiber holder according to a first embodiment is described.

Figure 2:
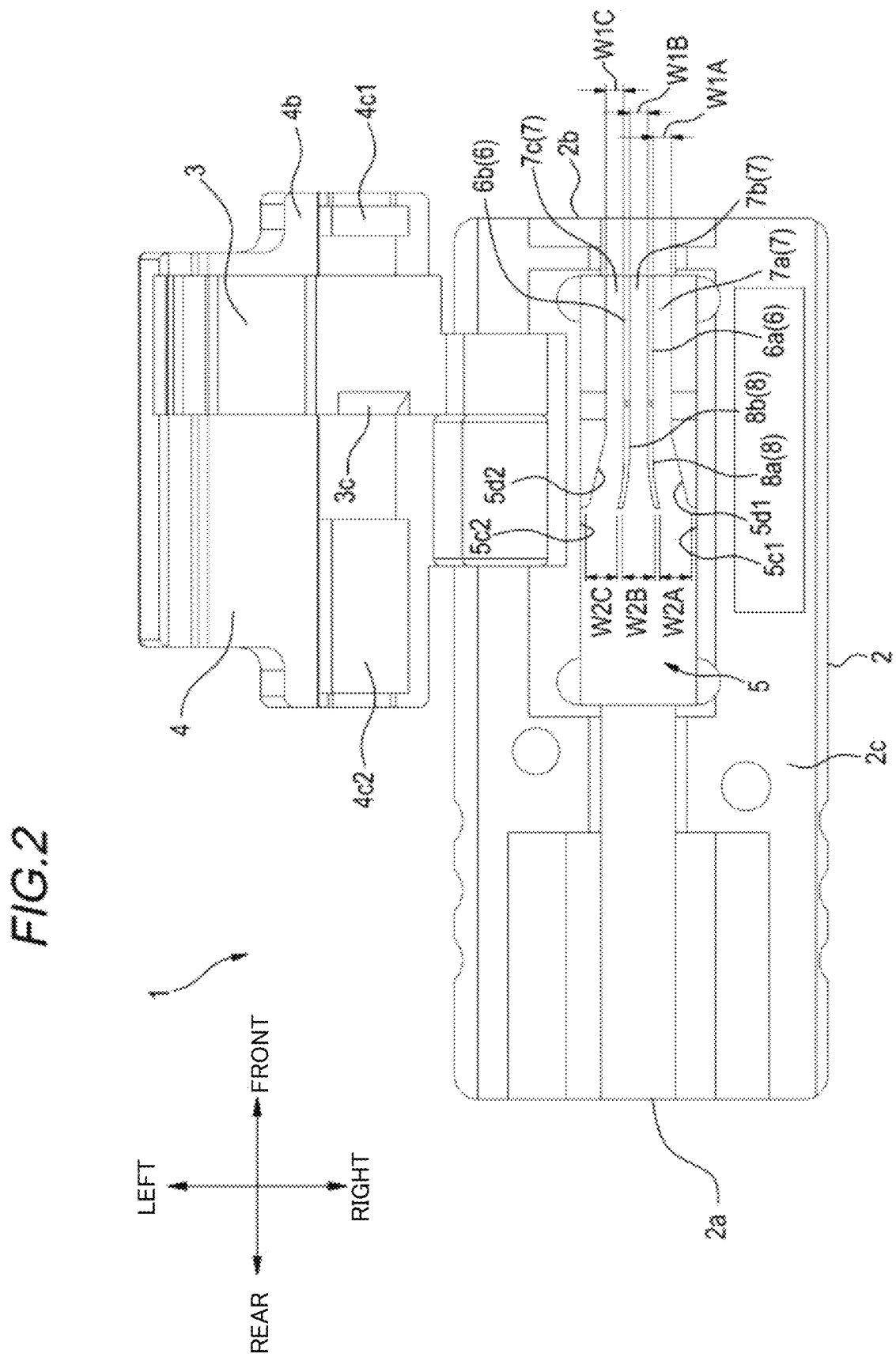
FIG. 2 is a top view of the optical fiber holder according to the first embodiment.

As shown in FIG. 1 and FIG. 2, the optical fiber holder 1 according to the first embodiment includes a holder body 2 and a first lid 3. The holder body 2 includes an housing portion 5 capable of housing a plurality of optical fibers (see FIG. 7 to FIG. 10 which are described later) such as a 12-core optical fiber ribbon. The housing portion 5 is a groove-shaped recess provided on an upper surface 2c of the holder body 2 from one end (front side end 2b) of the holder body 2 in a longitudinal direction to the other end (rear side end 2a).

Figure 3:
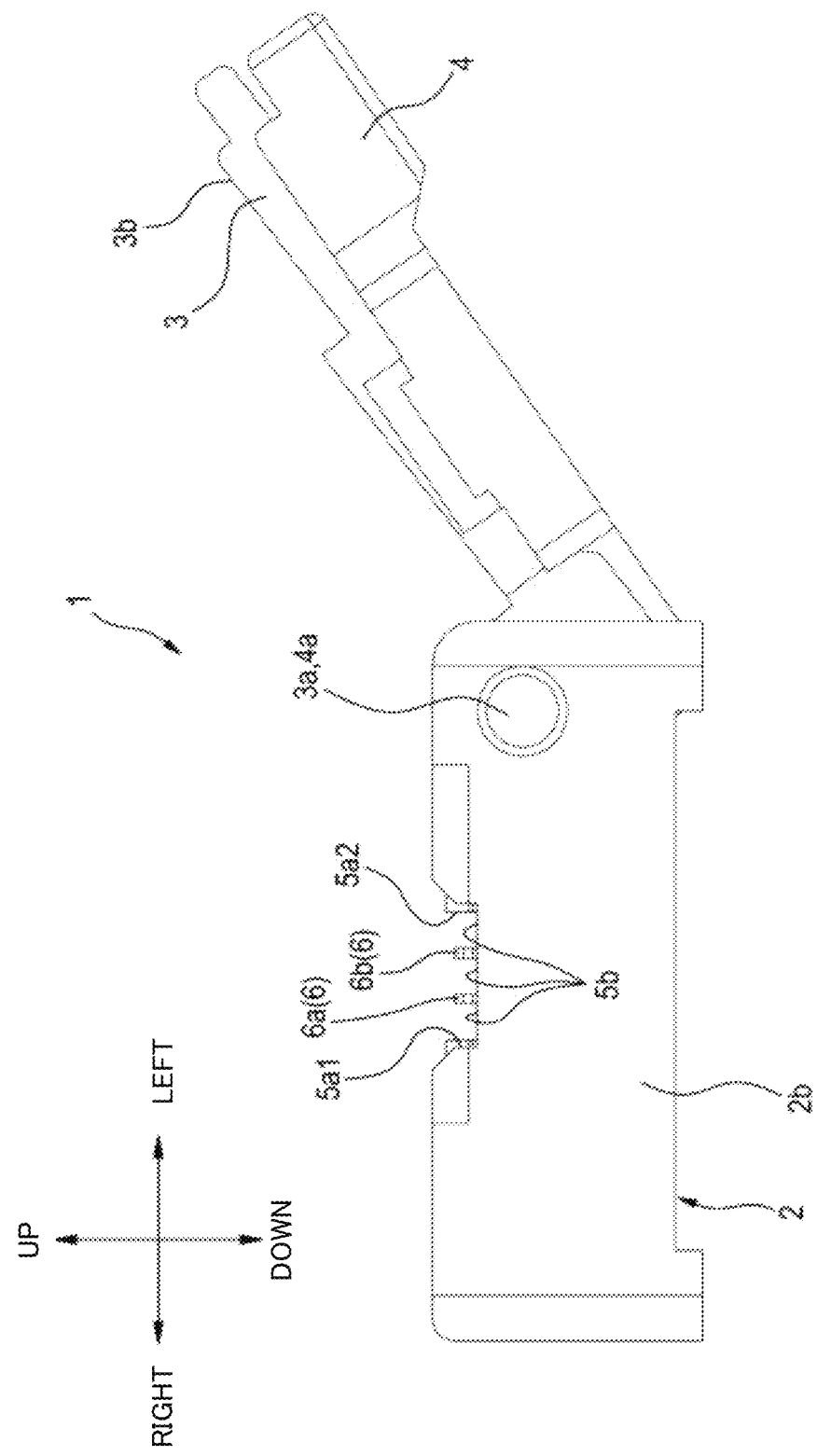
FIG. 3 is a side view of the optical fiber holder according to the first embodiment viewed from a front of an optical fiber insertion direction.

As shown in FIG. 1 to FIG. 3, the first lid 3 is rotatably connected to the holder body 2 via a hinge portion 3a and can be opened and closed with respect to the holder body 2. The optical fiber holder 1 includes at least one protrusion 6 at a position where the housing portion 5 is covered when the first lid 3 is closed. The protrusion 6 is provided such that a longitudinal direction thereof is along the longitudinal direction of the holder body 2, and in the first embodiment, a plurality of protrusions 6a, 6b are provided in the holder body 2. The protrusion 6 may be provided on a lower surface 3b of the first lid 3 instead of the holder body 2 as long as it can be disposed in the housing portion 5 when the first lid 3 is closed (FIG. 4).

Figure 4:
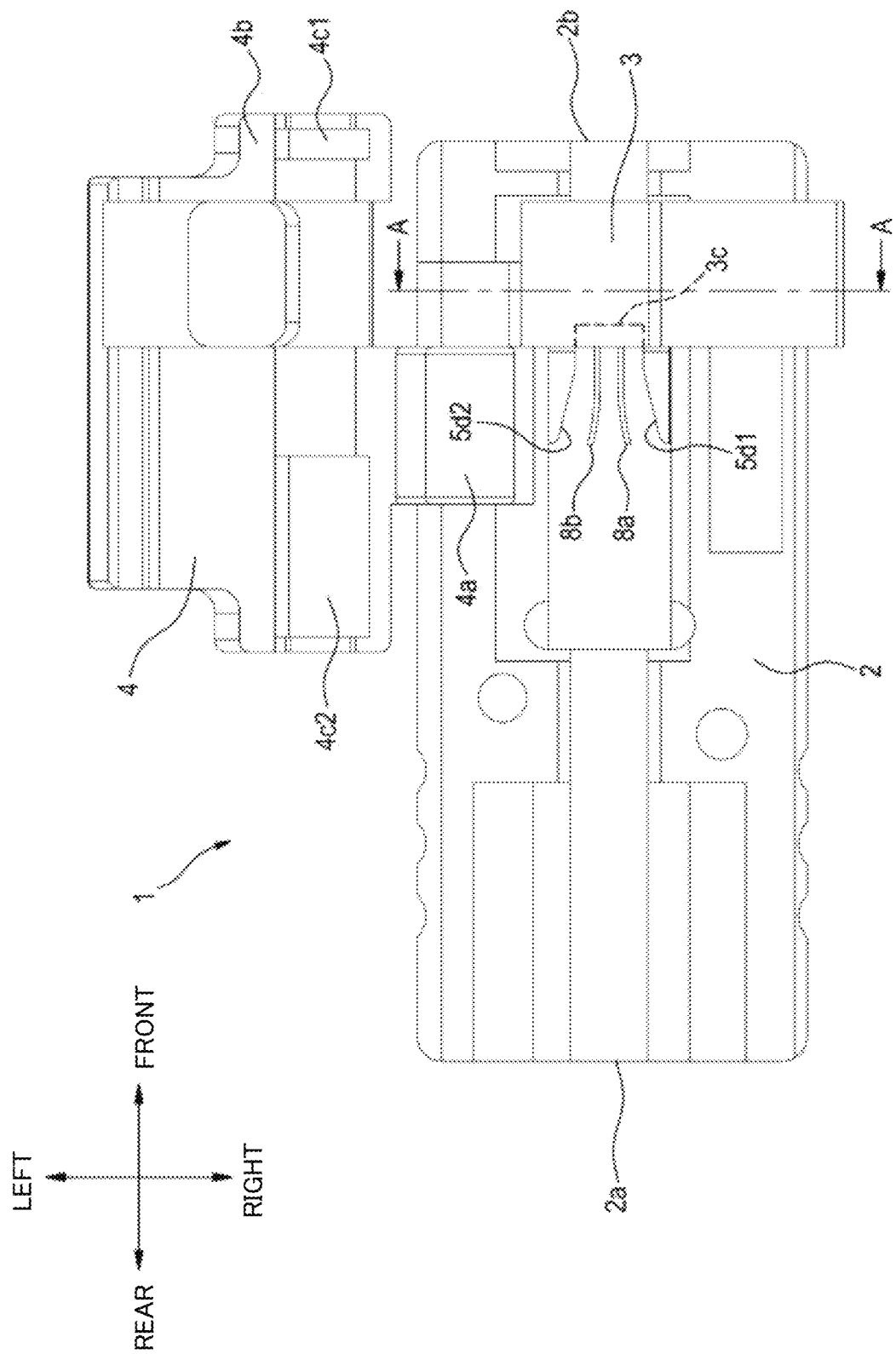
FIG. 4 is a top view showing a state in which a first lid of the optical fiber holder according to the first embodiment is closed with respect to a body.
Figure 5:
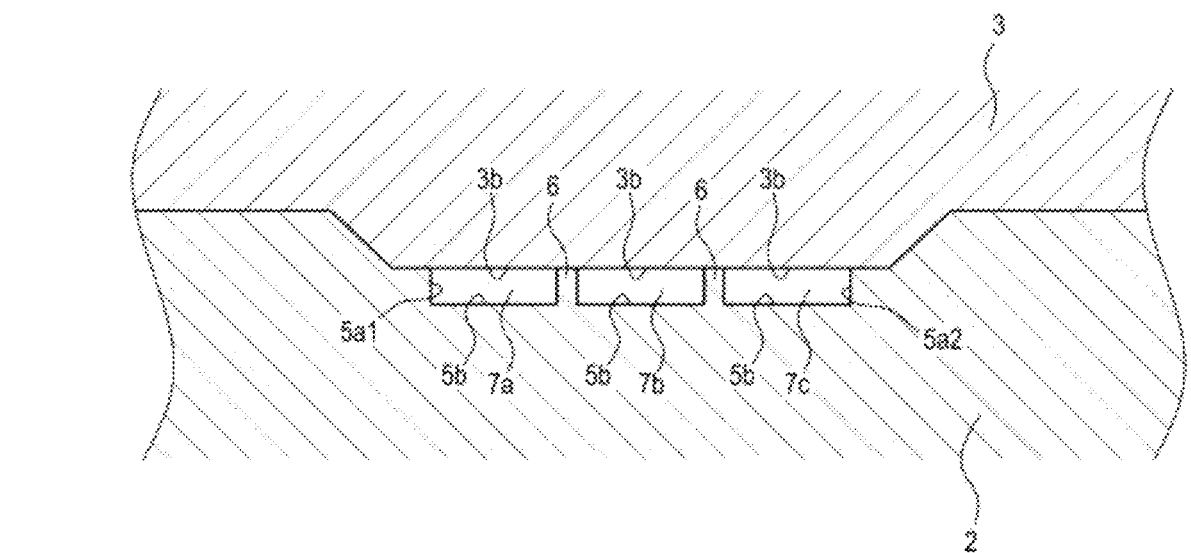
FIG. 5 is a sectional view taken along line A-A in FIG. 4.

As shown in FIG. 4 and FIG. 5, in the optical fiber holder 1, a plurality of sections 7 (7a, 7b, 7c) capable of housing the plurality of optical fibers in parallel respectively are formed in parallel by an inner surface (side surfaces 5a1, 5a2, lower surface 5b) of the housing portion 5, the lower surface 3b of the first lid 3, and the protrusion 6 when the first lid 3 is closed with respect to the holder body 2. In this case, a height (a space in the up-down direction between the lower surface 5b of the housing portion 5 and the lower surface 3b of the first lid 3) of each of the sections 7 (7a, 7b, 7c) is larger than an outer diameter of optical fibers to be inserted, and is small enough so that the optical fibers do not overlap with each other in the up-down direction in one section. For example, the height is (the outer diameter of the optical fibers to be inserted+0.02) mm or above and (twice of the outer diameter of the optical fibers−0.12) mm or below. When an optical fiber having an outer diameter of 0.20 mm is inserted, the height of each of the sections 7 (7a, 7b, 7c) is preferably 0.22 mm or above, and 0.28 mm or below.

As shown in FIG. 1 and FIG. 2, the lower surface 3b of the first lid 3 is provided with a tapered surface 3c which is recessed toward a rear end side (one side) of the sections 7 (7a, 7b, 7c) in the longitudinal direction. When the first lid 3 is closed, by the tapered surface 3c (FIG. 4), an upper surface (ceiling) of an entrance (rear end side) of the sections 7 (7a, 7b, 7c) is higher toward the outside of the sections 7. An upper portion of the protrusion 6 does not necessarily need to be in contact with the lower surface 3b when the first lid 3 is closed with respect to the holder body 2, and a space between the upper portion of the protrusion 6 and the lower surface 3b of the first lid 3 is sufficient to be narrowed so that the optical fibers does not move freely between the respective sections 7a, 7b, 7c. That is, the space is narrower than the outer diameter of the optical fibers to be inserted, more preferably (the outer diameter of the optical fibers to be inserted−0.02) mm or below. For example, when the optical fiber having an outer diameter of 0.20 mm is inserted, the space is less than 0.20 mm, preferably 0.18 mm or below.

Figure 6:
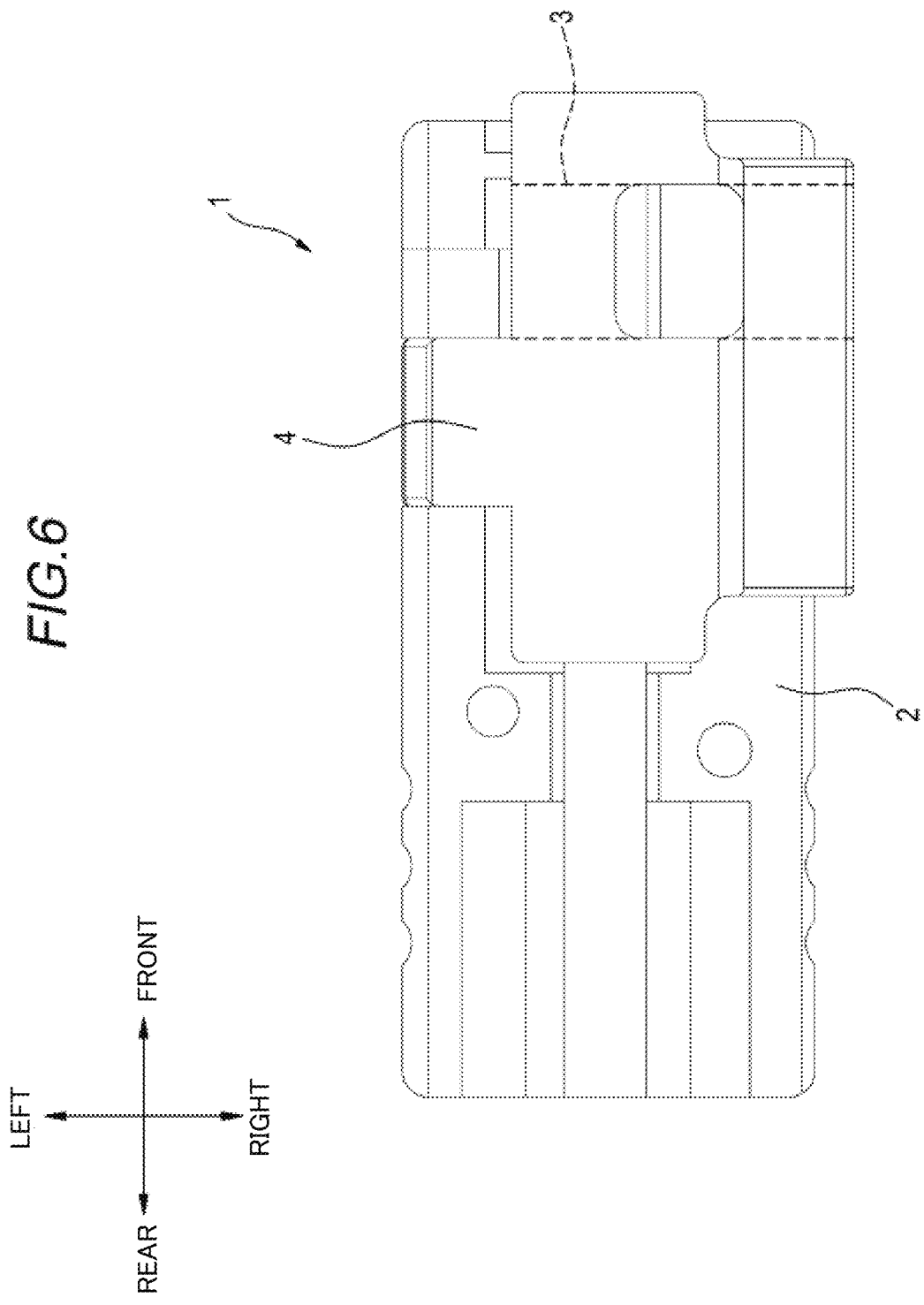
FIG. 6 is a top view showing a state in which the first lid and a second lid of the optical fiber holder according to the first embodiment are closed with respect to the body.

Further, in the first embodiment, the optical fiber holder 1 includes a second lid 4. The second lid 4 is rotatably connected to the holder body 2 via a hinge portion 4a and can be opened and closed with respect to the holder body 2. The hinge portion 3a and the hinge portion 4a are rotatable separately, and the first lid 3 and the second lid 4 can be opened and closed individually. A lower surface 4b of the second lid 4 is provided with protruding portions 4c1, 4c2 at portions corresponding to the housing portion 5 when the second lid 4 is closed with respect to the holder body 2 (FIG. 6). The second lid 4 is a lid that functions such that the plurality of optical fibers inserted into the sections 7 can be held in the housing portion 5 by the lower surfaces of the protruding portions 4c1, 4c2 and the lower surface 5b of the housing portion 5.

The holder body 2 includes a section outer protrusion 8 provided so as to be continuous from the protrusion 6 on one side (rear side) outside the sections 7 in the housing portion 5, and widening side surfaces 5d1, 5d2 are provided on both side surfaces 5c1, 5c2 on the inner side of the housing portion 5 on the rear side outside the sections 7 such that the widening side surfaces 5d1, 5d2 are respectively continuous from side surfaces 5a1, 5a2 of the sections 7a, 7c on both ends of the plurality of sections 7. The widening side surfaces 5d1, 5d2 have a shape in which a space between the widening side surfaces (5d1 and 5d2) is extended as being away from the sections 7 along the longitudinal direction of the housing portion 5. The protruding portion 4c1 of the second lid 4 is provided at a position that does not abut on the section outer protrusion 8 and the widening side surfaces 5d1, 5d2 when the second lid 4 is closed with respect to the holder body 2.

The shape of the widening side surfaces 5d1, 5d2 may be linear, curved, or a combination thereof. In addition, when an end far from the sections 7 of the widening side surfaces 5d1, 5d2 is a surface without an angle (curved surface or the like), the tips of the optical fibers is hardly hung on the end when the plurality of optical fibers are inserted into the housing portion 5.

When a plurality of protrusions 6 are included as shown in FIG. 1 and FIG. 2, the holder body 2 may be provided with a plurality of section outer protrusions 8. The plurality of section outer protrusions 8 are provided, for example, in a shape in which a space between adjacent section outer protrusions 8a and 8b is extended as being away from the sections 7 along the longitudinal direction of the housing portion 5.

(Method of Using the Optical Fiber Holder According to the First Embodiment)

Next, an example of a method of using the optical fiber holder according to the first embodiment is described with reference to FIG. 1 to FIG. 10.

Figure 7:
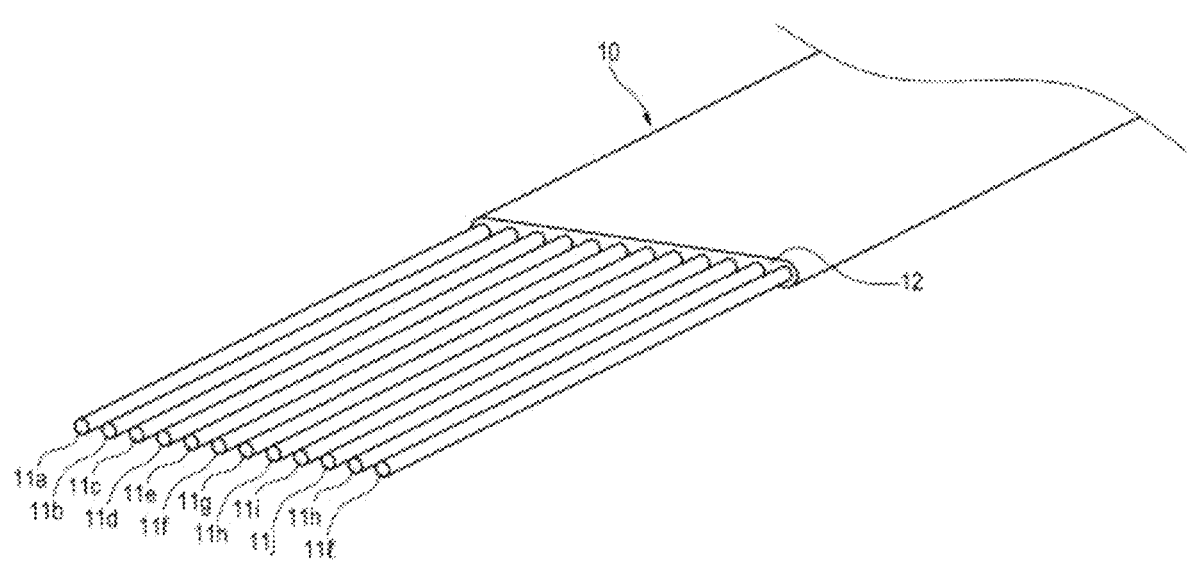
FIG. 7 is a perspective view showing an example of an optical fiber ribbon before the optical fiber ribbon is inserted into the optical fiber holder according to the first embodiment.

The plurality of optical fibers used in this example are, for example, a 12-core optical fiber ribbon 10 including a plurality of optical fiber core wires 11a to 11l shown in FIG. 7. The plurality of optical fiber core wires 11a to 11l are disposed in parallel in a direction orthogonal to respective longitudinal directions, and are collectively coated with a tape resin 12.

Figure 8:
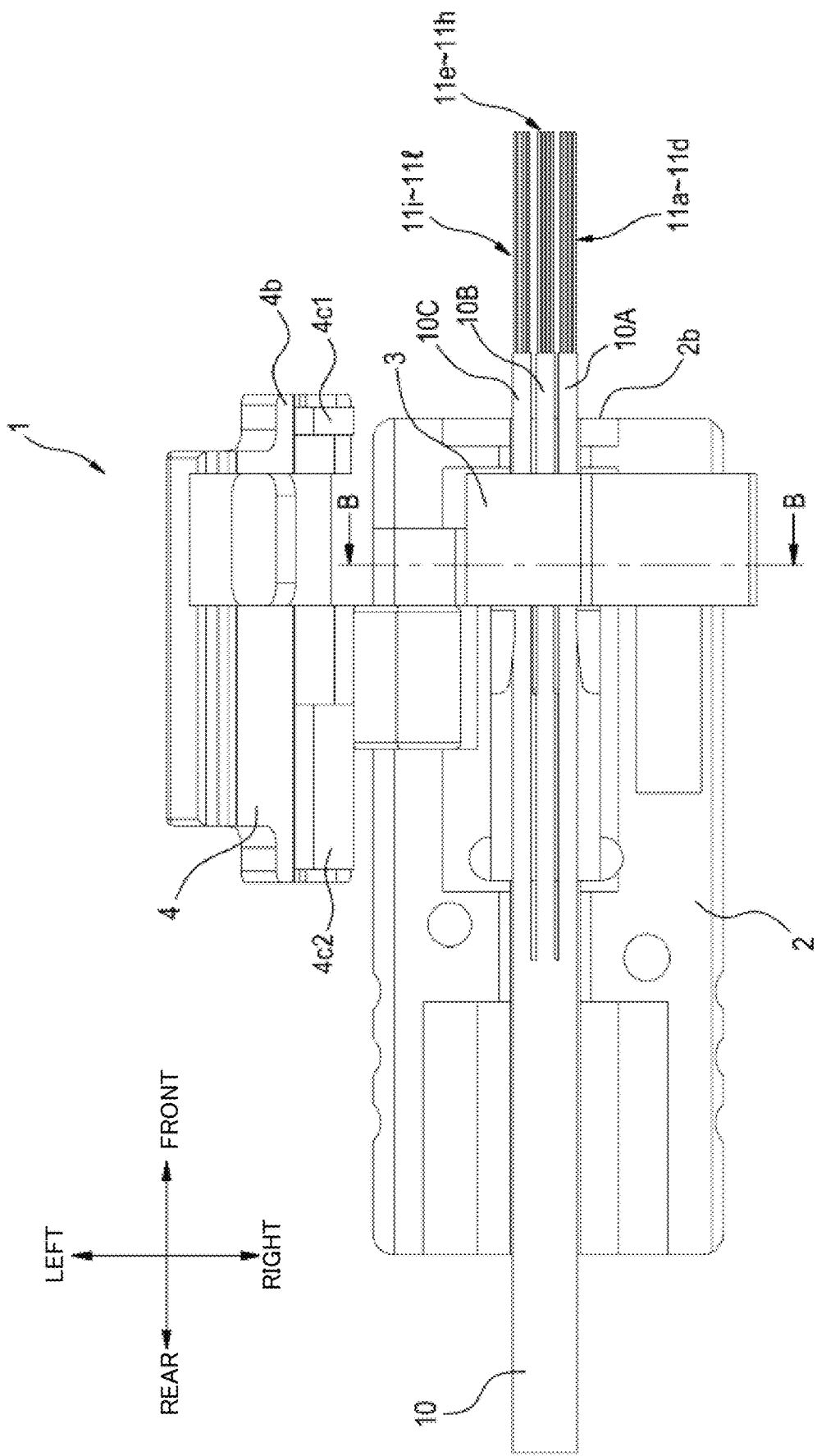
FIG. 8 is a top view showing a state in which a plurality of optical fibers are inserted into the optical fiber holder according to the first embodiment and the first lid is closed with respect to the body.

First, a tip end side of the optical fiber ribbon 10 is split into three optical fiber ribbons 10A, 10B, 10C for four cores (see FIG. 8). Then, the tape resin 12 on respective tip sides of the optical fiber ribbons 10A, 10B, 10C is removed, and the optical fiber core wires 11a to 11l are exposed by a predetermined length. The predetermined length is a length that makes fusion connection possible by the fusion machine or the like.

The optical fiber holder 1 described in FIG. 1 to FIG. 3 is in a state in which the first lid 3 is closed with respect to the holder body 2 as shown in FIG. 4. In the optical fiber holder 1 in the state shown in FIG. 4, the optical fiber ribbons 10 are inserted into the housing portion 5 from the rear side end 2a of the holder body 2 with a side where the optical fiber core wires 11a to 11l are exposed as a beginning. Since the optical fiber ribbon 10 of which the tip end side is described above includes three optical fiber ribbons 10A, 10B, 10C, the optical fiber ribbon 10A is inserted between the widening side surface 5d1 and the section outer protrusion 8a outside the sections 7 of the housing portion 5. The optical fiber ribbon 10B is inserted between the outer section protrusion 8a and the outer section protrusion 8b. The optical fiber ribbon 10C is inserted between the section outer protrusion 8b and the widening side surface 5d2.

Further, when the optical fiber ribbon 10 is pushed from the rear side, the optical fiber ribbons 10A, 10B, 10C are inserted into the sections 7a, 7b, 7c respectively and protrude from the front side end 2b of the holder body 2, and are in a state shown in FIG. 8. In FIG. 8, cross sections in the sections 7a, 7b, 7c are as shown in FIG. 9.

Further, from the state shown in FIG. 8, since the second lid 4 is closed with respect to the holder body 2 (see FIG. 6), the optical fiber ribbon 10 (optical fiber ribbons 10A, 10B, 10C) is held by being sandwiched by lower surfaces of the protruding portions 4c1, 4c2 of the second lid 4 and the lower surface 5b of the housing portion 5. Accordingly, it is possible to prevent the optical fiber ribbon 10 (optical fiber ribbons 10A, 10B, 10C) from being easily detached from the optical fiber holder 1.

Further, in the optical fiber holder 1, since the space between the adjacent section outer protrusions 8a and 8b is wider as being away from the sections along the longitudinal direction of the housing portion 5, a width W2B of an entrance (between ends of the section outer protrusions 8a, 8b) for inserting the optical fiber ribbon 10B is wider than a width W1B of the section 7b between the adjacent protrusions 6a, 6b.

Further, in the optical fiber holder 1, a space between the widening side surfaces (5d1 and 5d2) is extended as being away from the sections 7 along the longitudinal direction of the housing portion 5. Accordingly, the width W2A of an entrance (between the widening side surface 5d1 and an end of the section outer protrusion 8a) for inserting the optical fiber ribbon 10A and a width W2C of an entrance (between the widening side surface 5d2 and an end of the section outer protrusion 8b) for inserting the optical fiber ribbon 10C can be wider than a width W1A of the section 7a and a width W1C of the section 7c respectively even if the width W2B between ends of the section outer protrusions 8a, 8b is extended as described above.

Therefore, even when the widths of the sections 7 (7a, 7b, 7c) are not much with respect to the widths of the optical fiber ribbons (10A, 10B, 10C) to be inserted, since the widths (W2A, W2B, W2C) of the entrances are wider than the widths (W1A, W1B, W1C) of the sections 7 (7a, 7b, 7c), the optical fiber ribbons (10A, 10B, 10C) is easily inserted from the entrances.

In the lower surface 3b of the first lid 3 of the optical fiber holder 1, when the first lid 3 is closed, the tapered surface 3c is provided where upper surfaces (ceilings) of entrances (rear end sides) of the sections 7 (7a, 7b, 7c) are higher toward the outside of the sections 7. Therefore, in the sections 7 (7a, 7b, 7c), since the entrance (rear end side) portions are extended upward from the interior, the optical fiber ribbons (10A, 10B, 10C) are easily inserted.

As described above, FIG. 10 shows a perspective view of a portion of the optical fiber ribbon 10 held in the optical fiber holder 1 which protrudes from the front side end 2b of the holder body. The optical fiber ribbons 10A and 10B are aligned such that a gap d1 corresponding to the width of the protrusion 6a opens. The optical fiber ribbons 10B and 10C are aligned such that a gap d2 corresponding to the width of the protrusion 6b opens. In this example, since the widths of the protrusions 6a and 6b are the same, d1=d2.

The tip end sides of the optical fiber ribbons 10A, 10B, 10C are in a state in which the optical fiber core wires are exposed by peeling off the tape resin 12 separately and the twelve optical fiber core wires 11a to 11l are arranged in parallel, and in this state, the tip end sides can be fused with other optical fibers using the fusion machine or the like.

Here, a problem when the plurality of optical fiber core wires are fusion connected with each other is described with reference to the drawings. In the following explanatory drawings, a pattern diagram is made where an 8-core optical fiber ribbon is assumed for the explanation to be easily understood.

Figure 11A:
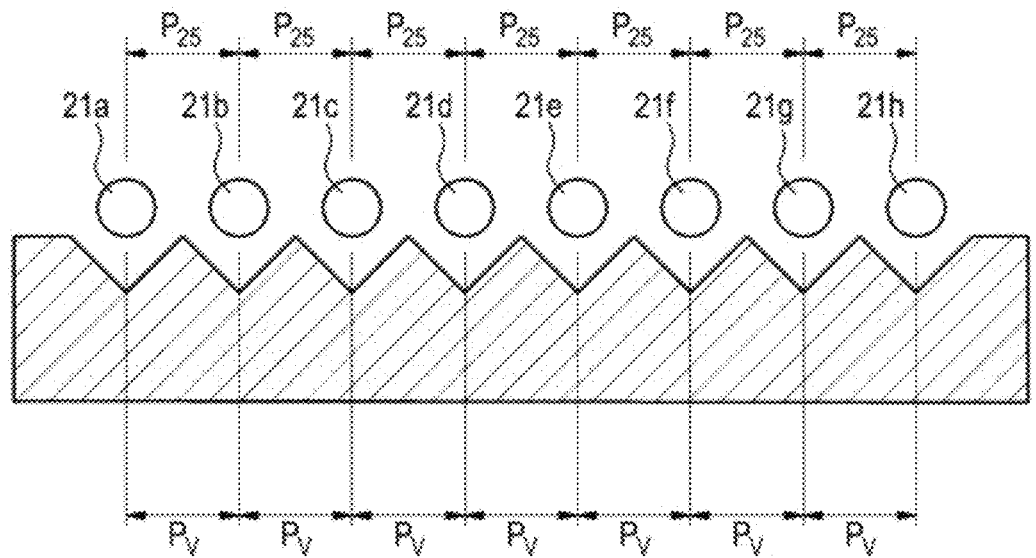
FIG. 11A is a schematic view showing an example in which a pitch of V grooves of a fusion machine or the like and an arrangement pitch of optical fibers are the same.

The fusion machine or the like which fuses the optical fiber ribbons with each other usually has a structure in which each of the optical fiber core wires is placed and fused in the V groove, and as shown in FIG. 11A, a pitch Pv of V grooves is set to be equal to an arrangement pitch P25 of the optical fiber core wires 21a to 21h.

Usually, an outer diameter of the used optical fiber core wire is 0.25 mm, and the arrangement pitch of the optical fiber ribbons arranged in parallel without a gap is 0.25 mm. Therefore, the pitch of the V grooves of the fusion machine or the like is usually 0.25 mm.

However, when the fusion machine or the like with the pitch of the V grooves of 0.25 mm is used to fuse the optical fiber ribbons different from 0.25 mm of the arrangement pitch, the following problems occur.

Figure 11B:
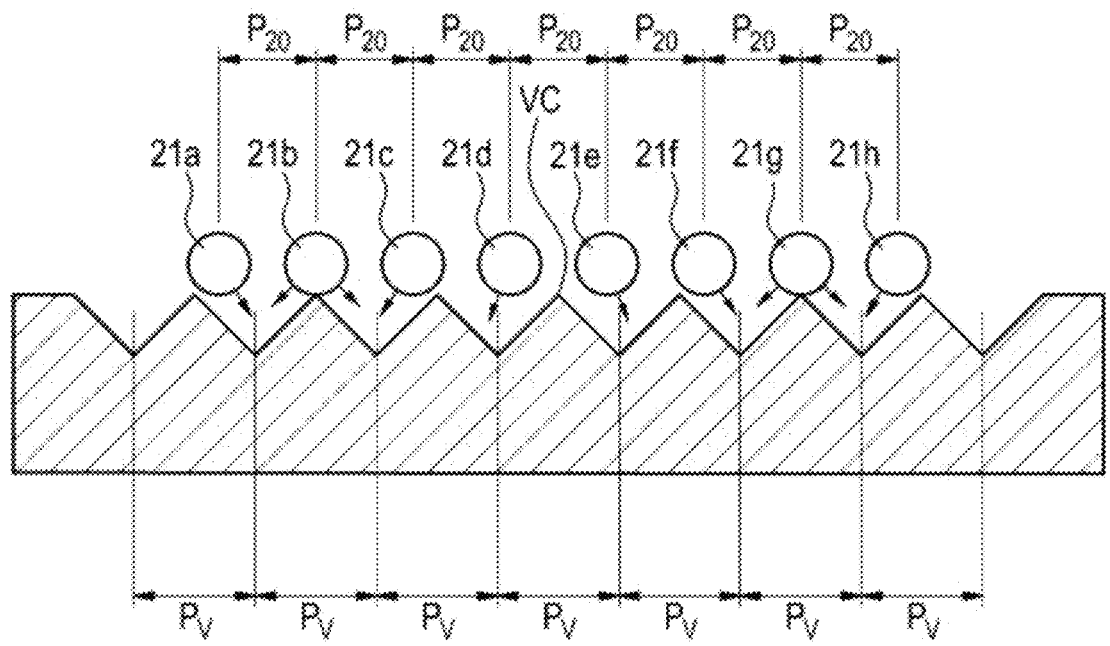
FIG. 11B is a schematic view showing an example of a case in which a pitch of V grooves of a fusion machine or the like and an arrangement pitch of optical fibers are different.

In an example shown in FIG. 11B, an arrangement pitch P20 of the optical fiber core wires 21a to 21h is 0.20 mm, which is narrower than the pitch Pv (0.25 mm) of the V grooves. Therefore, when a center of the arrangement of the optical fiber core wires 21a to 21h is aligned to a V groove top VC at a center position in a parallel width direction, positions of the V grooves and positions of the optical fiber core wires are shifted toward an end of the arrangement of the optical fiber core wires. Therefore, in the example shown in FIG. 11B, the optical fiber core wires 21a and 21h at two ends do not enter the V grooves in which the optical fiber core wires 21a and 21h should be put.

Therefore, inventors of the present invention have invented a configuration of the optical fiber holder in which the optical fiber ribbons can be arranged in parallel so that all of the optical fiber core wires can be reliably placed in the V grooves with respect to the V grooves with an arrangement pitch different from the arrangement pitch of the optical fiber ribbons.

That is, in a case of a configuration in which the optical fiber ribbons are divided into a plurality of groups and the sections through the groups are formed in parallel, since there is a space between adjacent sections in the sections, the optical fiber ribbons inserted into the respective sections are arranged in parallel at the space for each group.

If the space for each group is appropriate, even if the arrangement pitch of the optical fiber ribbons is somewhat shifted from the pitch of the V grooves of the fusion machine or the like, since only one optical fiber core wire that should enter each V groove abuts on an inclined surface of the V grooves of the fusion machine or the like and fits into the V grooves along the inclined surface, one optical fiber core wire can be placed in each V groove.

The inventors have further studied a range of the space for each of the groups.

Figure 12A:
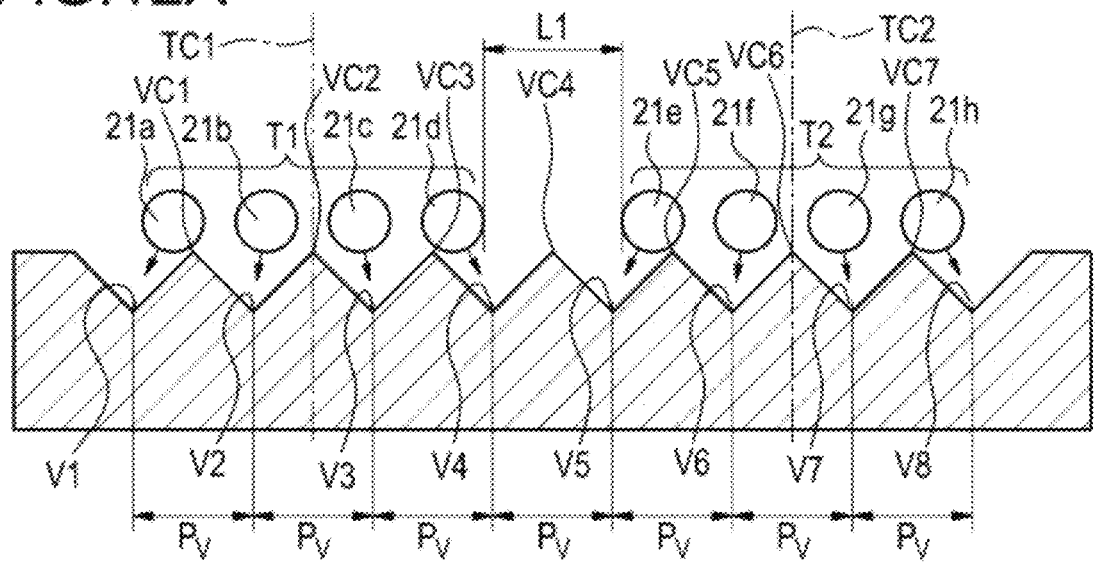
FIG. 12A is a schematic view showing an example of a position of the pitch of the V grooves of the fusion machine or the like and a position of the optical fibers, in a case where the optical fiber ribbon is divided into a plurality of groups and sections through the groups are formed in parallel.

As shown in FIG. 12A, when a center position TC1 of a group T1 coincides with a V groove top VC2 in the center of four V grooves V1 to V4 on the left side at a space L1 from an adjacent group T2 and the group T2 also coincides with a V groove top VC6 in the center of four V grooves V5 to V8 on the right side in the same way, all of the optical fiber core wires 21a to 21h can be placed one by one in the V grooves V1 to V8.

Figure 12B:
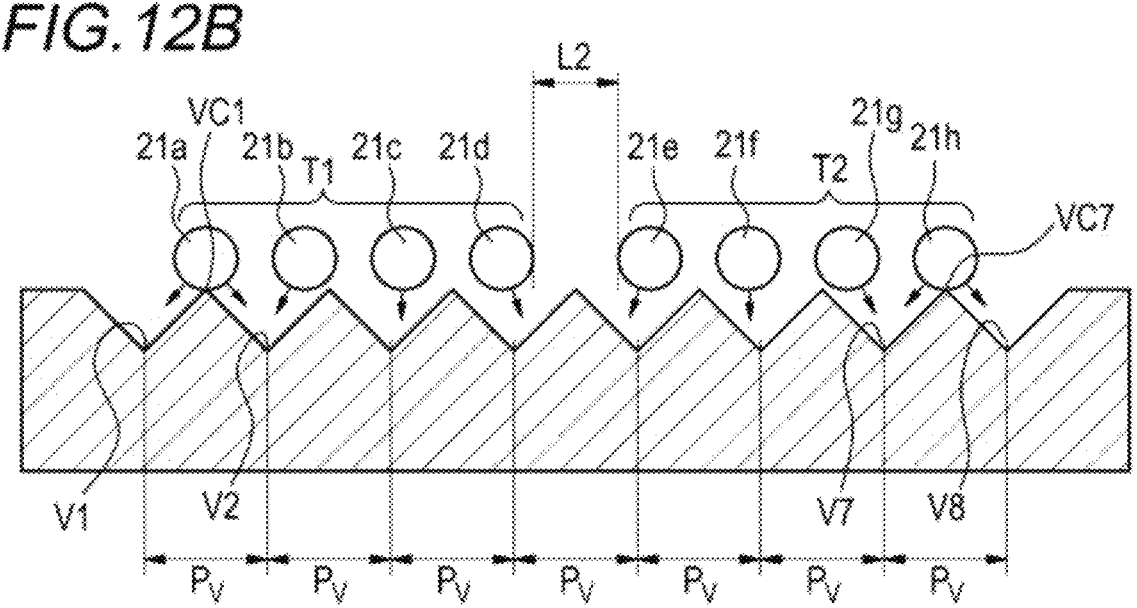
FIG. 12B is a schematic view showing an example of a position of the pitch of the V grooves of the fusion machine or the like and a position of the optical fibers, in a case where a space between the groups of the optical fiber ribbon is narrower than that in FIG. 12A.

As shown in FIG. 12B, when the optical fiber ribbons are divided into the plurality of groups and L2 is narrower than a space at which the sections through the groups are formed in parallel, the center of the optical fiber core wire 21a at the left end of the group T1 coincides with a V groove top VC1, and the center of the optical fiber core wire 21h at the right end of the optical fiber ribbon T2 coincides with a V groove top VC7. Therefore, the optical fiber core wire 21a may not enter a V groove V1 while the optical fiber core wire 21a should be put into the V groove V1, and the optical fiber core wire 21h may not enter a V groove V8 while the optical fiber core wire 21h should be put into the V groove V8. Further, when the space is narrower than L2, the centers of the optical fiber core wires 21a, 21h are located on sides of adjacent V grooves (V2, V7) and do not enter the V grooves (V1, V8) while the optical fiber core wires 21a, 21h should be put into the V grooves (V1, V8).

Figure 12C:
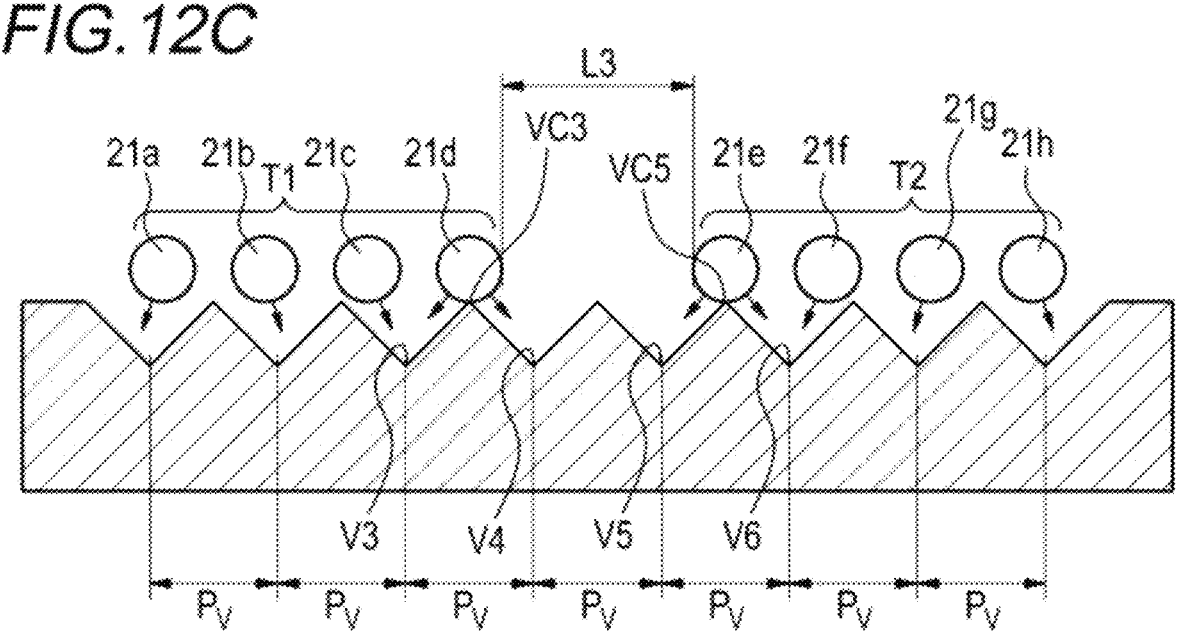
FIG. 12C is a schematic view showing an example of a position of the pitch of the V grooves of the fusion machine or the like and a position of the optical fibers in a case where a space between the groups of the optical fiber ribbon is wider than that in FIG. 12A.

As shown in FIG. 12C, when a space between the groups of the optical fiber ribbons is set to be wider than the above L1, and at a time when the space reaches a space L3, the center of the optical fiber core wire 21d at the right end of the group T1 coincides with a V groove top VC3, and the center of the optical fiber core wire 21e at the left end of the group T2 coincides with a V groove top VC5. Therefore, the optical fiber core wire 21d may not enter a V groove V4 while the optical fiber core wire 21d should be put into the V groove V4, and the optical fiber core wire 21h may not enter a V groove V5 while the optical fiber core wire 21h should be put into the V groove V5. Further, when the space is wider than L3, the centers of the optical fiber core wires 21d, 21e are located on sides of adjacent V grooves (V3, V6) and do not enter the V grooves (V4, V5) while the optical fiber core wires 21d, 21e should be put into the V grooves (V4, V5).

From the above consideration, the width of the protrusion 6 in the optical fiber holder 1 in this embodiment is preferably set to L2 or above and L3 or below. For example, when the optical fiber ribbons (or the plurality of optical fiber core wires) with a pitch of 0.20 mm are placed in the V grooves of the fusion machine or the like with a pitch of 0.25 mm, the width of the protrusion is preferably 0.17 mm or above and 0.27 mm or below. Accordingly, when optical fiber core wires with a pitch of 0.20 mm are placed in the V grooves of the fusion machine or the like with a pitch of 0.25 mm, only one optical fiber core wire abuts on an inclined surface of each V groove and fits into the V groove along the inclined surface, so one optical fiber core wire can be placed in each V groove.

The space between the center position TC1 of the group T1 of the optical fiber ribbons and the center position TC2 of the group T2 of the optical fiber ribbons corresponds to a distance between the centers of the adjacent sections 7 (7a and 7b or 7b and 7c) in the optical fiber holder 1 in this embodiment.

For example, when the space between TC1 and TC2 in FIG. 12A is wider than the state in FIG. 12C, V grooves in which the optical fiber core wires do not enter are formed in the center. When the space between TC1 and TC2 is narrowed and narrower than the state in FIG. 12B, V grooves in which the optical fiber core wires do not enter are formed at the end.

Therefore, for example, when the optical fiber ribbons (or the plurality of optical fiber core wires) with a pitch of 0.20 mm is placed in the V grooves of the fusion machine or the like with a pitch of 0.25 mm, the distance between the centers of the adjacent sections 7 is preferably set to 0.95 mm or above and 1.05 mm or below. Accordingly, by preventing formation of V grooves in which the optical fiber core wires do not enter, only one optical fiber core wire abuts on an inclined surface of each V groove and fits into the V groove along the inclined surface, so one optical fiber core wire can be placed in each V groove.

Second Embodiment

An optical fiber holder according to a second embodiment is described.

Figure 13:
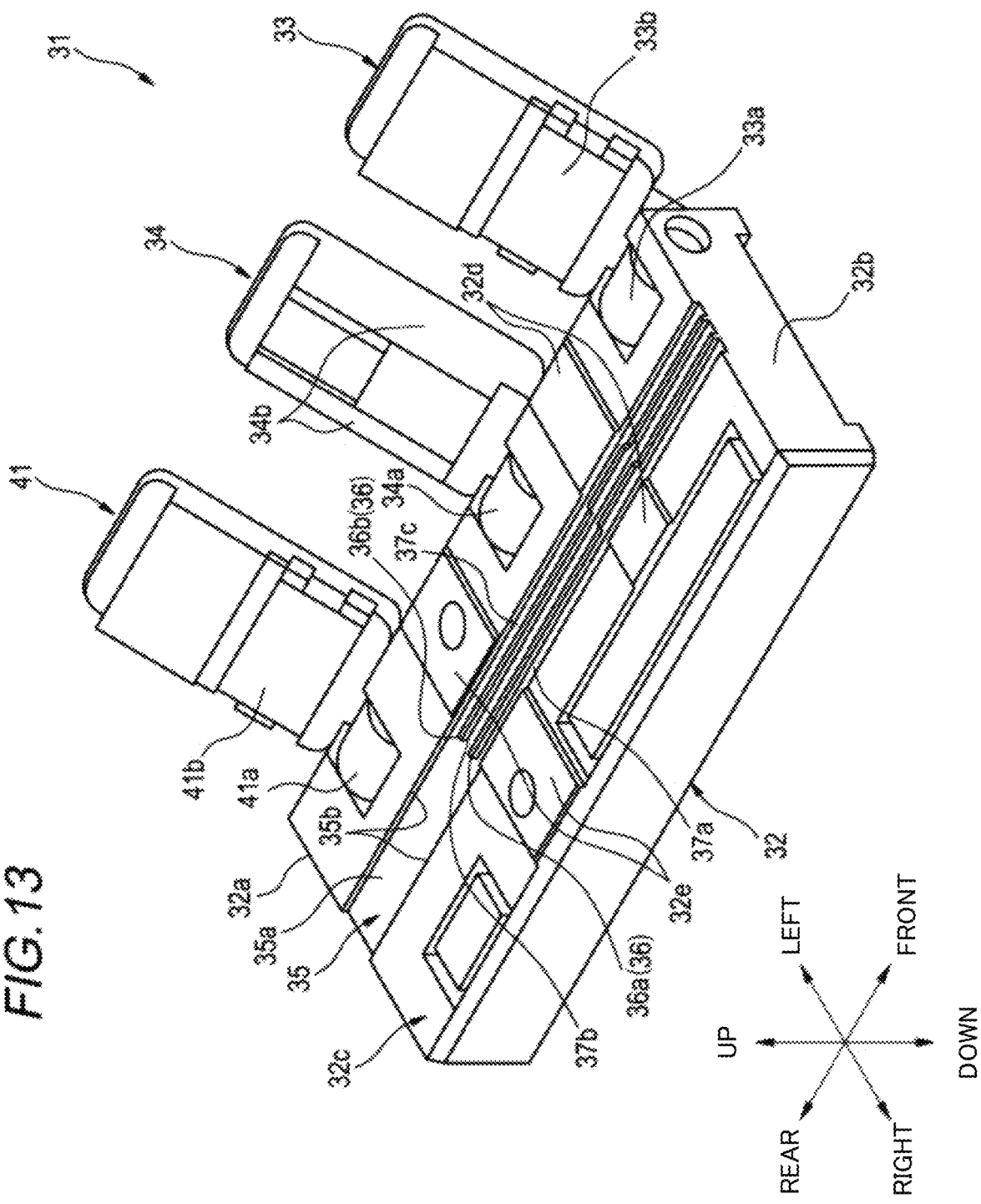
FIG. 13 is a perspective view of an optical fiber holder according to a second embodiment.
Figure 14:
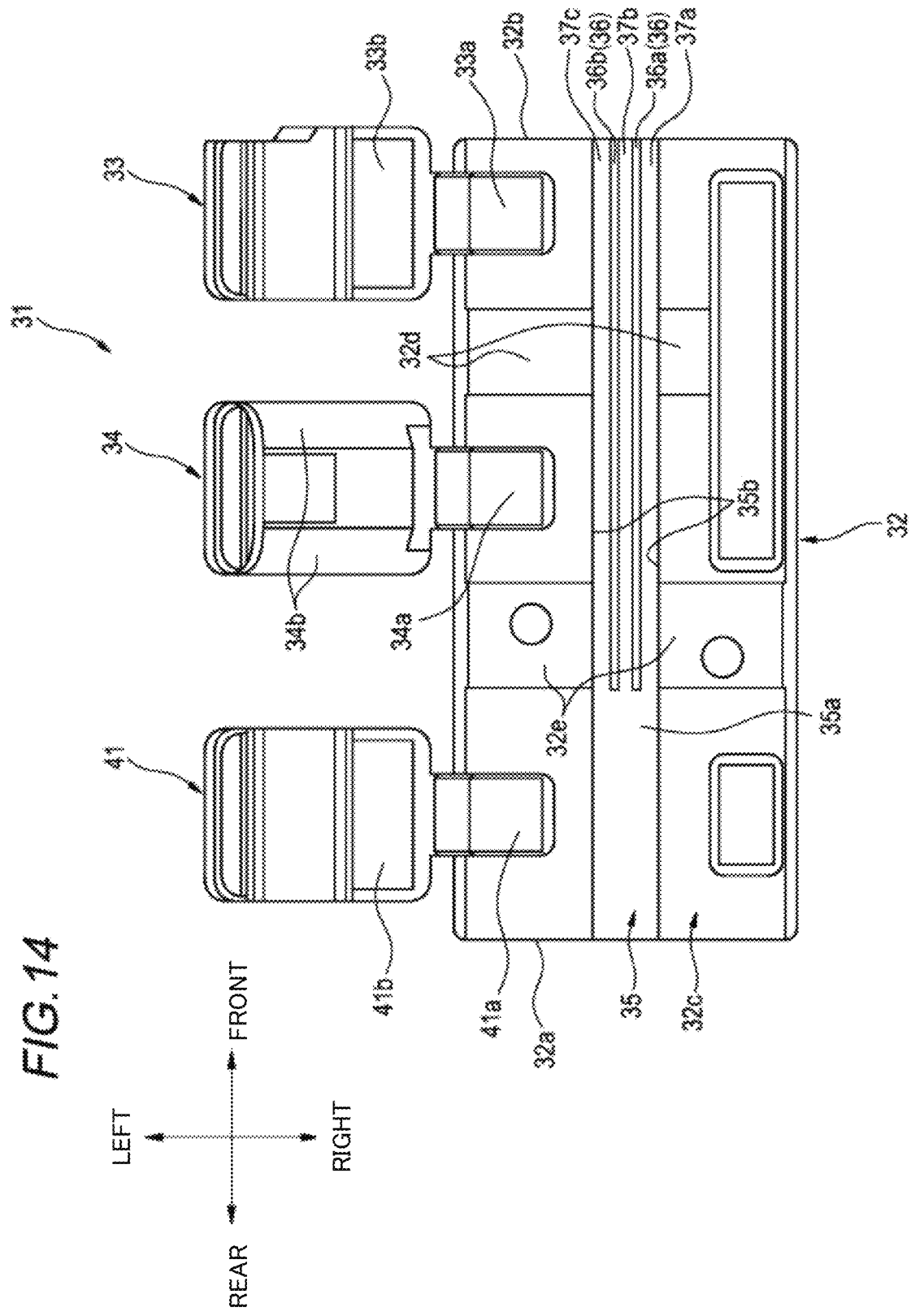
FIG. 14 is a top view of the optical fiber holder according to the second embodiment.

As shown in FIG. 13 and FIG. 14, an optical fiber holder 31 according to the second embodiment includes a holder body 32, a first lid 33, a second lid 34, and a third lid 41. The holder body 32 includes a housing portion 35 capable of housing the plurality of optical fibers (see FIG. 7 to FIG. 10) such as a 12-core optical fiber ribbon. The housing portion 35 is a linear groove-shaped recess provided on an upper surface 32c of the holder body 32 from one end (front side end 32b) of the holder body 32 in a longitudinal direction to the other end (rear side end 32a).

The first lid 33, the second lid 34, and the third lid 41 are provided at a predetermined space in order from the front side end 32b in the longitudinal direction of the holder body 32. The first lid 33 is rotatably connected to the holder body 32 via a hinge portion 33a and can be opened and closed with respect to the holder body 32. In the same way, the second lid 34 is rotatably connected to the holder body 32 via a hinge portion 34a and can be opened and closed with respect to the holder body 32. In the same way, the third lid 41 is rotatably connected to the holder body 32 via a hinge portion 41a and can be opened and closed with respect to the holder body 32.

Figure 15:
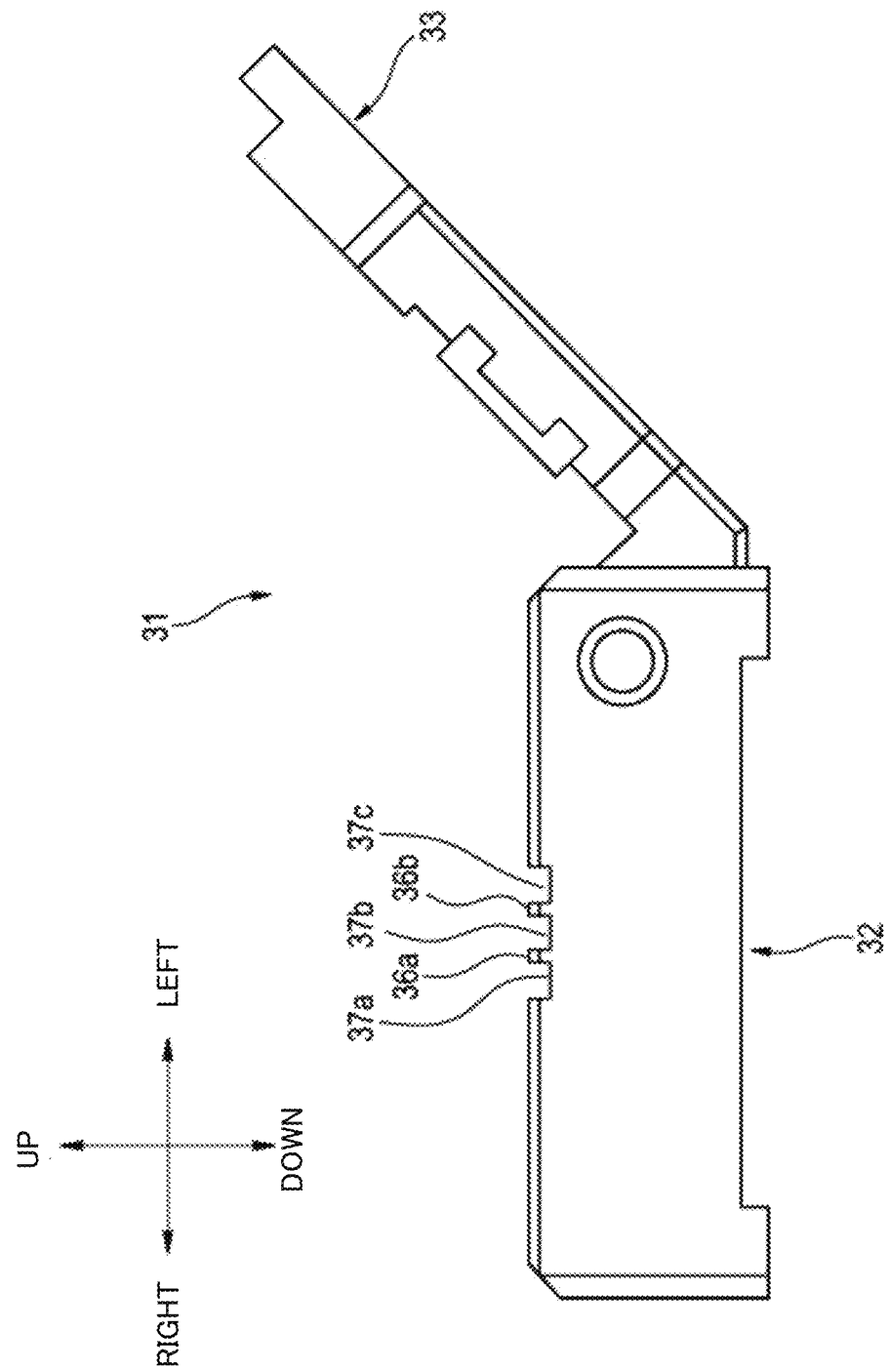
FIG. 15 is a side view of the optical fiber holder according to the second embodiment viewed from a front of an optical fiber insertion direction.
Figure 16:
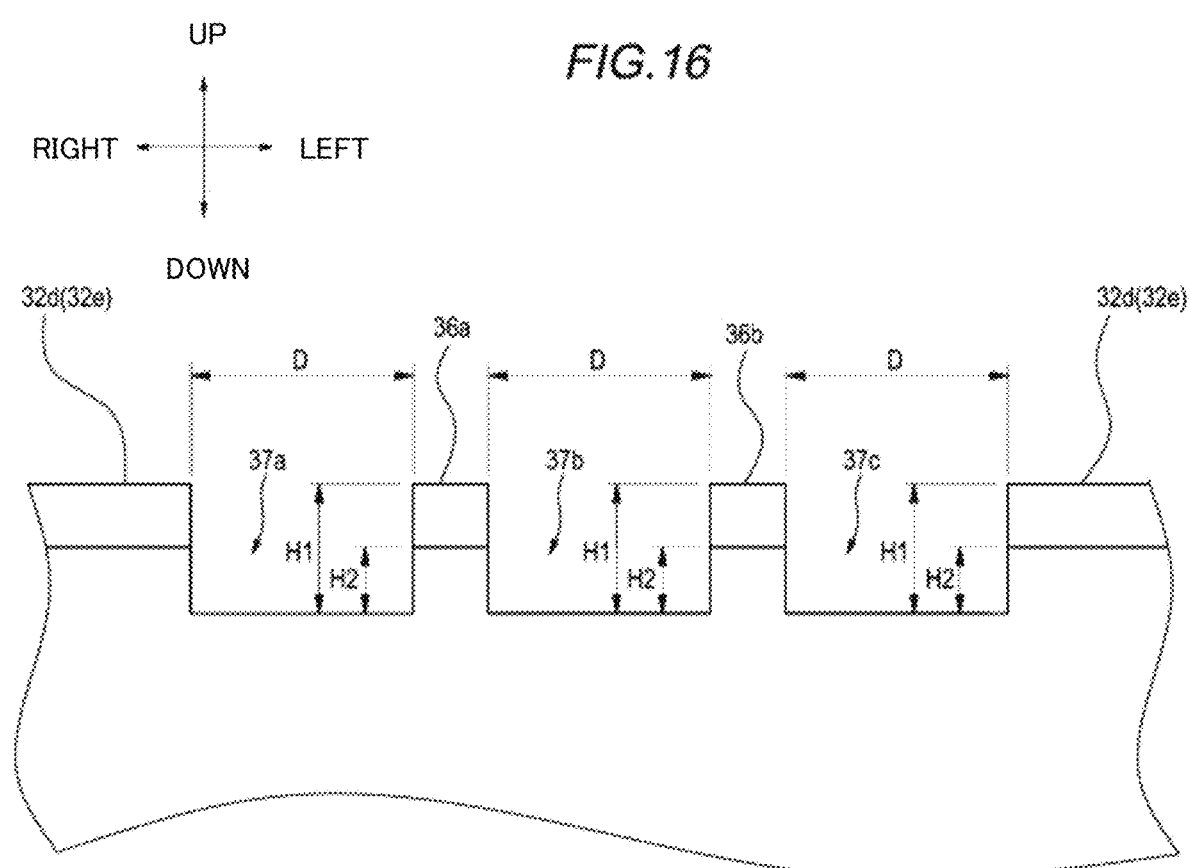
FIG. 16 is an enlarged view of a portion showing a protrusion and a groove provided in the holder body in FIG. 15.

As shown in FIG. 14 to FIG. 16, the housing portion 35 includes at least one protrusion 36 on a side of the front side end 32b including a position where the housing portion 35 is covered when the first lid 33 and the second lid 34 are closed. The protrusion 36 is provided such that a longitudinal direction of the protrusion 36 is in parallel with an inner surface 35b of the housing portion 35 along the longitudinal direction of the holder body 32, and in the second embodiment, a plurality of protrusions 36a, 36b are provided linearly to the front side end 32b in the holder body 32. Grooves 37a, 37b, 37c are provided with a constant groove width, which are capable to house the plurality of optical fibers in parallel respectively between the protrusions 36a, 36b and the inner surfaces 35b on two sides of the housing portion 35. As described above, since the protrusions 36a, 36b are linearly provided, the grooves 37a, 37b, 37c are also formed linearly along the longitudinal direction of the holder body 32.

The housing portion 35 includes wide grooves where the protrusion 36 is not provided on a side of the rear side end 32a including a covered position when the third lid 41 is closed.

Further, the upper surface 32c of the holder body 32 includes regions having different heights from the bottom surface 35a of the housing portion 35 (see FIG. 13). In the upper surface 32c, a region 32d between a place where the first lid 33 is closed and a place where the second lid 34 is closed and a region 32e between a place where the second lid 34 is closed and a place where the third lid 41 is closed are higher than the other regions, and the height of the regions 32b and 32e is 0.3 mm in this example. There is a place where the protrusions 36a, 36b have a different height (height from the bottom surface 35a of the housing portion 35). As shown in FIG. 16, in the region 32d (see FIG. 13 and FIG. 14), a height H1 of the protrusions 36a, 36b is 0.3 mm higher than the other places in this example. A height H2 of the protrusions 36a, 36b at other places is 0.15 mm in this example.

As shown in FIG. 16, groove widths D of the grooves 37a, 37b, 37c are 0.9 mm respectively in this example. Since the groove width D is 0.9 mm, for example, the size is suitable for insertion of four optical fibers having an outer diameter of 0.20 mm.

As shown in FIG. 14, a rubber 33b is disposed at a place where the housing portion 35 is covered when the first lid 33 is closed. The rubber 33b prevents the optical fibers housed in the grooves 37a, 37b, 37c of the housing portion 35 respectively from affecting the posture of the optical fibers and suppresses the optical fibers from jumping out from the holder body 32.

As shown in FIG. 14, the second lid 34 is a lid for adjusting a cutting length of the optical fibers and confirming that the optical fibers enter the grooves 37a, 37b, 37c, and the optical fibers do not move when not reliably entering the grooves 37a, 37b, 37c. That is, the second lid 34 does not hold the optical fibers put in the grooves 37a, 37b, 37c. The second lid 34 has an R shape such that the optical fibers are easily inserted into longitudinal ends 34b of the holder body 32 when the second lid 34 is closed.

As shown in FIG. 14, the third lid 41 is disposed with a rubber 41b at a position where the housing portion 35 is covered when the third lid 41 is closed. After the optical fibers are set and the first lid 33 and the second lid 34 are closed, the third lid 41 is also closed, and the optical fiber ribbons are reliably held by the rubber 41b.

(Method of Using the Optical Fiber Holder According to the Second Embodiment)

Next, an example of a method of using the optical fiber holder according to the second embodiment is described. The same parts as those of the first embodiment are not described as appropriate. For example, same as the first embodiment, the 12-core optical fiber ribbon 10 including the plurality of optical fiber core wires 11a to 11l shown in FIG. 7 is used.

First, in the optical fiber holder 31, all the lids (33, 34, 41) are opened. The tape resin 12 on tip sides of the optical fiber ribbon 10 is removed, and the optical fiber core wires 11a to 11l are exposed and inserted into the housing portion 35 from the above of the holder body 32.

Figure 17:
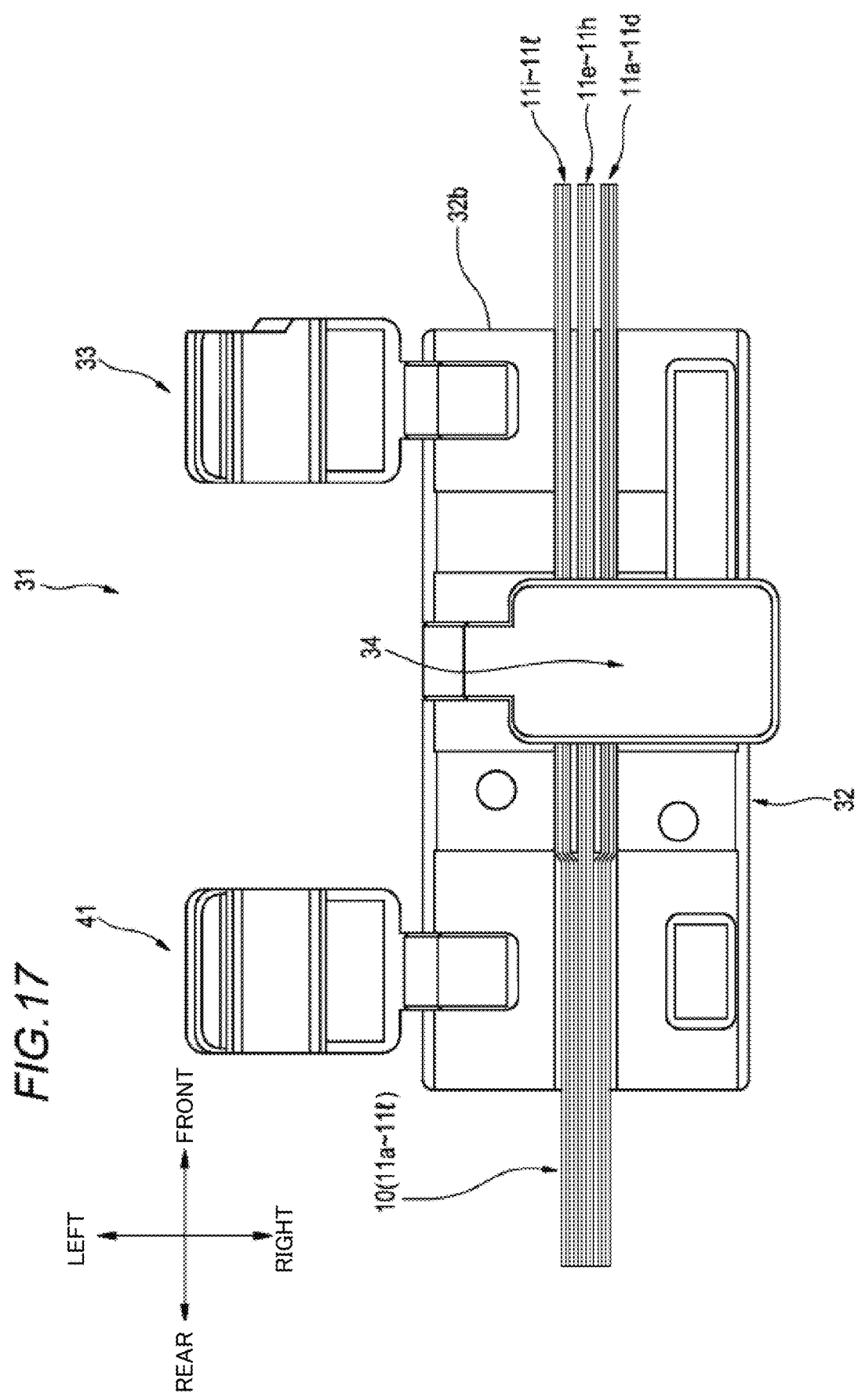
FIG. 17 is a top view showing a state in which a plurality of optical fibers are inserted into the optical fiber holder according to the second embodiment and a second lid is closed with respect to the body.

Next, while handling the optical fiber core wires 11a to 11l with, for example, a ball of a finger, four of the optical fiber core wires are inserted into each of the grooves 37a, 37b, 37c (for example, the optical fiber cores 11a to 11d are put in the groove 37a, the optical fiber cores 11e to 11h are put in the groove 37b, and the optical fiber cores 11i to 11l are put in the groove 37c). If four optical fiber ribbons are inserted into each groove, it is confirmed that the second lid 34 is closed to move the optical fiber ribbon 10 back and forth in the longitudinal direction of the holder body 32, and the optical fiber core wires do not overlap and four optical fiber ribbons enter each of the groove portions 37a, 37b, 37c reliably. If the above confirmation is made, the optical fiber ribbon 10 is pressed from the rear side until the optical fiber protruding from the front side end 32b of the holder body 32 has an appropriate cutting length, and for example, is in a state shown in FIG. 17. Then, the first lid 33 and the third lid 41 are closed, and all the lids (33, 34, 41) are closed (see FIG. 18). As in the first embodiment, the tip end side of the optical fiber ribbon 10 is in a state in which twelve optical fiber core wires 11a to 11l are arranged in parallel, and can be fused with another optical fiber using the fusion machine or the like in this state.

In the optical fiber holder 31 of the second embodiment, even in a case where the width of the grooves 37a, 37b, 37c is not much large with respect to the width of a predetermined number (for example, four) of optical fibers, it is possible to view that a predetermined number (for example, four) of optical fibers enter each of the grooves 37a, 37b, 37c from the upside of the holder body 32.

In the optical fiber holder 31 of the second embodiment, the second lid 34 is closed to move the optical fiber ribbon 10 back and forth in the longitudinal direction of the holder body 32, and thus it is possible to confirm that the optical fibers do not overlap and a predetermined number (for example, four) of the optical fibers enter each of the groove portions 37a, 37b, 37c reliably.

Further, since the optical fiber holder 31 of the second embodiment does not need to provide an introduction portion of the optical fiber ribbon in the front-rear direction, the grooves 37a, 37b, 37c can be lengthened in the longitudinal direction of the holder body 32, and an effect of suppressing the inclination of the optical fiber set in the optical fiber holder 31 is increased.

Further, since the height H of the protrusions 36a, 36b is set to 0.3 mm at the maximum, a guide function can be obtained and the operation can be easy when the plurality of optical fibers (optical fiber core wires) having an outer diameter of 0.20 mm for example are put into the grooves while handling with a ball of a finger. The depth of the grooves 37a, 37b, 37c is 0.3 mm at maximum. If the groove is deep, it may become difficult to overlap and set the optical fibers up and down in the groove, but in this example, since the grooves 37a, 37b, 37c have a depth of 0.3 mm or below, overlapping of the optical fibers in the groove can be suppressed.

Further, in this example, since the depth of the grooves 37a, 37b, 37c in a portion where the first lid 33 and the third lid 41 are closed is 0.15 mm, the optical fiber core wire having an outer diameter of 0.20 mm can be pressed and reliably held with the rubber 33b and the rubber 41b.

Although the present invention has been described in detail with reference to particular embodiments, it is apparent to those skilled in the art that various changes and modifications can be made without departing from the spirit and scope of the present invention. The numbers, positions, shapes, and the like of components described above are not limited to the above embodiments, and can be changed to suitable numbers, positions, shapes, and the like on carrying out the present invention.

For example, in each of the above embodiments, a method of using a normal optical fiber ribbon for an optical fiber holder has been described, and in a state in which the plurality of optical fiber core wires are arranged in parallel, an intermittent-connection-type optical fiber ribbon may be used such that the intermittent-connection-type optical fiber ribbon includes connecting portions in which adjacent optical fiber core wires are connected to each other and non-connecting portions in which adjacent optical fiber core wires are not connected to each other, and connecting portions and the non-connecting portions are provided intermittently in the longitudinal direction.

The optical fiber ribbon may have the number of cores other than twelve cores as long as the optical fiber ribbon has eight cores or more.

The plurality of optical fiber cores arranged in parallel with the optical fiber holder may be used.

DESCRIPTION OF REFERENCE NUMERALS 1 optical fiber holder
2 holder body
2a rear side end
2b front side end
2c upper surface
3 first lid (lid)
3a hinge portion
3b lower surface
3c tapered surface
4 second lid
4a hinge portion
4b lower surface
4c1, 4c2 protruding portion
5 housing portion
5a1, 5a2 side surface
5b lower surface
5c1, 5c2 side surface
5d1, 5d2 widening side surface
6, 6a, 6b protrusion
7, 7a, 7b, 7c section
8, 8a, 8b section outer protrusion 10 optical fiber ribbon
11a to 11l optical fiber core wire
10A, 10B, 10C optical fiber ribbon
21a to 21h optical fiber core wire
T1, T2 group (of optical fiber ribbons)
31 optical fiber holder
32 holder body
32a rear side end
32b front side end
32c upper surface
32d, 32e region
33 first lid
33a, 34a, 41a hinge portion
33b, 41b rubber
34 second lid
34b end
35 housing portion
35a bottom surface
35b inner surface
36, 36a, 36b protrusion
37a, 37b, 37c groove
41 third lid

The invention claimed is:

1. An optical fiber holder comprising:
a holder body;
a first lid; and
a second lid, wherein
the holder body includes a housing portion that is configured to house a plurality of optical fibers,
the holder body includes at least one linear protrusion along a longitudinal direction of the holder body in the housing portion,
the housing portion includes a plurality of grooves that include a constant groove width and that is configured to house the plurality of optical fibers in parallel respectively between the protrusion and an inner surface of the housing portion,
the plurality of optical fibers are configured to be held in parallel respectively in the plurality of grooves in a state where the first lid is closed with respect to the holder body,
the plurality of optical fibers are configured to be housed in a movable state where the plurality of optical fibers are movable in parallel respectively in the plurality of grooves, in a state where the second lid is closed with respect to the holder body, and
the first lid is provided in a front side end of the holder body along the longitudinal direction and the second lid is provided in a rear side end of the holder body along the longitudinal direction.

2. The optical fiber holder according to claim 1, wherein a height of the at least one protrusion is 0.15 mm or above and 0.3 mm or below.

3. The optical fiber holder according to claim 1, further comprising:
a third lid, wherein
the housing portion includes wide grooves where the at least one linear protrusion is not provided and is at a covered position in a state where the third lid is closed with respect to the holder body,
the third lid is provided in the rear side end of the holder body behind the second lid along the longitudinal direction.

4. An optical fiber holder comprising:
a holder body;
a first lid; and
a second lid, wherein
the holder body includes a housing portion that is configured to house a plurality of optical fibers,
the holder body or the first lid includes at least one protrusion along a longitudinal direction of the holder body in the housing portion or the first lid that is capable of being disposed in the housing portion,
a plurality of sections are formed in parallel such that the plurality of sections are configured to house the plurality of optical fibers in parallel respectively by an inner surface of the housing portion, a lower surface of the first lid, and the at least one protrusion in a state where the first lid is closed with respect to the holder body,
the plurality of optical fibers housed in the housing portion and inserted into the section are configured to be held in the housing portion in a state where the second lid is closed with respect to the holder body, and
the first lid is provided in a front side end of the holder body along the longitudinal direction and the second lid is provided in the front side end of the holder body along the longitudinal direction and provided in a rear side end of the holder body along the longitudinal direction.

5. The optical fiber holder according to claim 4, wherein a width of the at least one protrusion is 0.17 mm or above and 0.27 mm or below.

6. The optical fiber holder according to claim 4, wherein a distance between centers of adjacent sections is 0.95 mm or above and 1.05 mm or below.

7. The optical fiber holder according to claim 4, wherein the holder body includes a section outer protrusion that is provided to be continuous from the at least one protrusion on one side of the housing portion outside the section,
widening side surfaces are provided on two both side surfaces in an inner side of the housing portion on one side outside the section such that the widening side surfaces are respectively continuous from side surfaces of sections, among the plurality of sections, on both side surfaces in the inner side of the housing portion, and
the widening side surfaces have a shape in which a space between the widening side surfaces is extended along a longitudinal direction of the housing portion as being away from the section.

8. The optical fiber holder according to claim 4, comprising:
a plurality of the protrusions, wherein
the at least one protrusion is one of the plurality of protrusions,
the holder body includes, on one side outside the section of the housing portion, a plurality of section outer protrusions provided so as to be continuous from the plurality of the protrusions respectively, and
the plurality of section outer protrusions have a shape in which a space between adjacent section outer protrusions is extended along a longitudinal direction of the housing portion as being away from the section.

9. The optical fiber holder according claim 4, wherein the first lid is provided with a tapered surface where the lower surface is recessed on one side end of the section in a longitudinal direction.

* * * * *